(12) United States Patent  (10) Patent No.: US 7,613,109 B2
Jha et al.  (45) Date of Patent: Nov. 3, 2009

(54) PROCESSING DATA FOR A TCP CONNECTION USING AN OFFLOAD UNIT

(75) Inventors: Ashutosh K. Jha, Sunnyvale, CA (US); Radoslav Danilak, Santa Clara, CA (US); Paul J. Gyugyi, Sunnyvale, CA (US); Thomas A. Maufer, Menlo Park, CA (US); Sameer Nanda, San Jose, CA (US); Anand Rajagopalan, Santa Clara, CA (US); Paul J. Sidenblad, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 848 days.

(21) Appl. No.: 10/731,632

(22) Filed: Dec. 9, 2003

(65) Prior Publication Data

US 2004/0257986 A1 Dec. 23, 2004

Related U.S. Application Data

(60) Provisional application No. 60/476,570, filed on Jun. 5, 2003.

(51) Int. Cl.
G08C 15/00 (2006.01)
G06F 3/00 (2006.01)
G06F 15/16 (2006.01)
G06F 15/76 (2006.01)

(52) U.S. Cl. ............... 370/230; 370/412; 709/250; 710/56; 712/34

(58) Field of Classification Search ......... 370/229–231, 370/412, 413; 709/201–203, 230; 710/1, 710/22, 26, 30, 52; 712/1, 28, 30, 31, 34–36
See application file for complete search history.

(56) References Cited

U.S. PATENT DOCUMENTS

| 5,740,467 | A | 4/1998 | Chmielecki et al. |
| 5,937,169 | A | 8/1999 | Connery et al. |
| 6,034,963 | A | 3/2000 | Minami et al. |
| 6,226,680 | B1 | 5/2001 | Boucher et al. |
| 6,246,683 | B1 * | 6/2001 | Connery et al. ............ 370/392 |
| 6,247,060 | B1 | 6/2001 | Boucher et al. |
| 6,310,884 | B1 | 10/2001 | Odenwald, Jr. |
| 6,330,659 | B1 | 12/2001 | Poff et al. |
| 6,334,153 | B2 * | 12/2001 | Boucher et al. ............ 709/230 |
| 6,389,479 | B1 | 5/2002 | Boucher et al. |

(Continued)

FOREIGN PATENT DOCUMENTS

AU 1126699 A 5/1999

(Continued)

*Primary Examiner*—Aung S Moe
*Assistant Examiner*—Kerri M Rose
(74) *Attorney, Agent, or Firm*—Patterson & Sheridan, LLP

(57) ABSTRACT

A method and apparatus for processing data received and transmitted on a TCP connection is described. An offload unit processes received data for which a special case does not exist, to produce payload data, which is uploaded directly to application memory. The offload unit partially processes received data for which a special case does exist and uploads the partially processed received data to a buffer stored in system memory. The partially processed received data is then further processed by a TCP stack to produce payload data, which is copied to application memory.

20 Claims, 20 Drawing Sheets

U.S. PATENT DOCUMENTS

| | | | |
|---|---|---|---|
| 6,393,457 B1 * | 5/2002 | Allison et al. | 709/201 |
| 6,393,487 B2 | 5/2002 | Boucher et al. | |
| 6,427,171 B1 | 7/2002 | Craft et al. | |
| 6,427,173 B1 | 7/2002 | Boucher et al. | |
| 6,434,620 B1 * | 8/2002 | Boucher et al. | 709/230 |
| 6,436,620 B1 | 8/2002 | Aylward et al. | |
| 6,470,415 B1 | 10/2002 | Starr et al. | |
| 6,591,302 B2 | 7/2003 | Boucher et al. | |
| 6,629,125 B2 | 9/2003 | Elzur et al. | |
| 6,658,480 B2 | 12/2003 | Boucher et al. | |
| 6,687,758 B2 | 2/2004 | Craft et al. | |
| 6,697,868 B2 * | 2/2004 | Craft et al. | 709/230 |
| 6,751,665 B2 | 6/2004 | Philbrick et al. | |
| 6,757,248 B1 | 6/2004 | Li et al. | |
| 6,757,746 B2 | 6/2004 | Boucher et al. | |
| 6,757,756 B1 | 6/2004 | Lanteigne et al. | |
| 6,760,799 B1 * | 7/2004 | Dunlap et al. | 710/260 |
| 6,775,693 B1 | 8/2004 | Adams | |
| 6,938,092 B2 | 8/2005 | Burns | |
| 6,941,386 B2 | 9/2005 | Craft et al. | |
| 6,965,941 B2 | 11/2005 | Boucher et al. | |
| 6,976,085 B1 | 12/2005 | Aviani et al. | |
| 6,996,070 B2 | 2/2006 | Starr et al. | |
| 7,042,898 B2 | 5/2006 | Blightman et al. | |
| 7,089,326 B2 | 8/2006 | Boucher et al. | |
| 7,093,099 B2 | 8/2006 | Bodas et al. | |
| 7,158,522 B1 | 1/2007 | Singh et al. | |
| 7,254,637 B2 | 8/2007 | Pinkerton et al. | |
| 7,272,653 B2 | 9/2007 | Levy-Abegnoli et al. | |
| 7,346,701 B2 | 3/2008 | Elzur et al. | |
| 2001/0021949 A1 | 9/2001 | Blightman et al. | |
| 2001/0023460 A1 | 9/2001 | Boucher et al. | |
| 2001/0027496 A1 | 10/2001 | Boucher et al. | |
| 2001/0036196 A1 | 11/2001 | Blightman et al. | |
| 2001/0037397 A1 | 11/2001 | Boucher et al. | |
| 2001/0037406 A1 | 11/2001 | Philbrick et al. | |
| 2001/0047433 A1 | 11/2001 | Boucher et al. | |
| 2001/0053148 A1 | 12/2001 | Bilic et al. | |
| 2002/0087732 A1 | 7/2002 | Boucher et al. | |
| 2002/0091844 A1 | 7/2002 | Craft et al. | |
| 2002/0095519 A1 | 7/2002 | Philbrick et al. | |
| 2002/0145976 A1 | 10/2002 | Meyer et al. | |
| 2002/0147839 A1 | 10/2002 | Boucher et al. | |
| 2002/0156927 A1 | 10/2002 | Boucher et al. | |
| 2002/0161919 A1 | 10/2002 | Boucher et al. | |
| 2003/0079033 A1 | 4/2003 | Craft et al. | |
| 2003/0140124 A1 | 7/2003 | Burns | |
| 2003/0158906 A1 * | 8/2003 | Hayes | 709/211 |
| 2003/0167346 A1 | 9/2003 | Craft et al. | |
| 2003/0188013 A1 | 10/2003 | Nishikado et al. | |
| 2003/0200284 A1 | 10/2003 | Philbrick et al. | |
| 2004/0003126 A1 | 1/2004 | Boucher et al. | |
| 2004/0030745 A1 | 2/2004 | Boucher et al. | |
| 2004/0042483 A1 | 3/2004 | Elzur et al. | |
| 2004/0049601 A1 | 3/2004 | Boyd et al. | |
| 2004/0054813 A1 | 3/2004 | Boucher et al. | |
| 2004/0062245 A1 | 4/2004 | Sharp et al. | |
| 2004/0062246 A1 | 4/2004 | Boucher et al. | |
| 2004/0064578 A1 | 4/2004 | Boucher et al. | |
| 2004/0064589 A1 | 4/2004 | Boucher et al. | |
| 2004/0064590 A1 | 4/2004 | Starr et al. | |
| 2004/0073703 A1 | 4/2004 | Boucher et al. | |
| 2004/0078480 A1 | 4/2004 | Boucher et al. | |
| 2004/0088262 A1 | 5/2004 | Boucher et al. | |
| 2004/0095883 A1 * | 5/2004 | Chu et al. | 370/235 |
| 2004/0100952 A1 | 5/2004 | Boucher et al. | |
| 2004/0111535 A1 | 6/2004 | Boucher et al. | |
| 2004/0117509 A1 | 6/2004 | Craft et al. | |
| 2004/0158640 A1 | 8/2004 | Philbrick et al. | |
| 2004/0158793 A1 | 8/2004 | Blightman et al. | |
| 2004/0240435 A1 | 12/2004 | Boucher et al. | |
| 2004/0249998 A1 | 12/2004 | Rajagopalan et al. | |
| 2005/0122980 A1 | 6/2005 | Anand et al. | |
| 2005/0141561 A1 | 6/2005 | Craft et al. | |
| 2005/0149632 A1 | 7/2005 | Minami et al. | |
| 2005/0160139 A1 | 7/2005 | Boucher et al. | |
| 2005/0175003 A1 | 8/2005 | Craft et al. | |
| 2005/0188123 A1 | 8/2005 | Chen | |
| 2005/0193316 A1 | 9/2005 | Chen | |
| 2005/0198198 A1 | 9/2005 | Craft et al. | |
| 2005/0204058 A1 | 9/2005 | Philbrick et al. | |
| 2005/0278459 A1 | 12/2005 | Boucher et al. | |
| 2006/0004904 A1 | 1/2006 | Sarangam et al. | |
| 2006/0010238 A1 | 1/2006 | Craft et al. | |
| 2006/0069792 A1 | 3/2006 | Pinkerton et al. | |
| 2006/0161674 A1 | 7/2006 | Sun et al. | |
| 2006/0168281 A1 | 7/2006 | Starr et al. | |
| 2007/0064724 A1 | 3/2007 | Minami et al. | |

FOREIGN PATENT DOCUMENTS

| | | |
|---|---|---|
| AU | 1533399 A | 3/2000 |
| CA | 2341211 A1 | 3/2000 |
| DE | 1116118 T1 | 8/2003 |
| EP | 1116118 A1 | 7/2001 |
| JP | 2002524005 T | 7/2002 |
| WO | WO 9922306 A1 | 5/1999 |
| WO | WO 0013091 A1 | 3/2000 |

* cited by examiner

| Tag 575 | Legacy Buffer Address 555 |
| --- | --- |
| Tag 580 | Legacy Buffer Address 560 |
| Tag 585 | Legacy Buffer Address 565 |

Legacy Buffer Tag Table 590

| Legacy Buffer Address 555 | Legacy Buffer Length 570 | Tag 575 |
| --- | --- | --- |

| 1007 | 1005 | 1010 |

Fig. 10A

| 1007 | 1015 | 1020 | 1025 |

| 1007 | 1015 | 1030 | 1035 |

Fig. 10B

PROCESSING DATA FOR A TCP CONNECTION USING AN OFFLOAD UNIT

CROSS-REFERENCE TO RELATED APPLICATION(S)

This application claims priority from commonly owned provisional U.S. Patent Application Ser. No. 60/476,570 entitled "HARDWARE-OPTIMIZED TCP/IP (HOT) PROCESSING," filed Jun. 5, 2003, having common inventors and assignee as this application, which is incorporated by reference as though fully set forth herein.

FIELD OF THE INVENTION

One or more aspects of the invention generally relate to Transmission Control Protocol (TCP) processing, and more particularly to optimization of TCP-based communications.

BACKGROUND

Conventional TCP processing is exemplified by systems and methods developed to accelerate data transfer between a client and a server. Software implementations executed on a host processor, e.g., Central Processing Unit (CPU), are comparatively inexpensive and slow compared with expensive dedicated hardware implementations designed to offload TCP processing from the host processor.

FIG. 1 is a block diagram of an exemplary embodiment of a prior art computer system generally designated 100 including a CPU 110 and a Network Interface Card (NIC) 150. Computing System 100 may be a desktop computer, server, laptop computer, palm-sized computer, tablet computer, game console, cellular telephone, computer based simulator, or the like. A Bus 112 coupling CPU 110 to a System Controller 120 may be a front side bus (FSB). Accordingly, Computing System 100 may be a hub-based architecture, also known as an INTEL® hub architecture, where System Controller 120 is a memory controller hub and an I/O Bridge 140 is coupled to System Controller 120 via a Hub-to-hub Interface 126. System Controller 120 is coupled to System Memory 130 via a Memory Bus 132. I/O Bridge 140 includes a controller for Peripheral Component Interface (PCI) Bus 182 and may include controllers for a System Management Bus 142, a Universal Serial Bus 144, and the like. I/O Bridge 140 may be a single integrated circuit or single semiconductor platform. Examples of System Controller 120 known in the art include INTEL® Northbridge. Examples of I/O Bridge 140 known in the art include INTEL® Southbridge and NVIDIA® Media and Communications Processor (MCP) chips.

NIC 150 may share PCI bus 182 with one or more PCI Devices 180. NIC 150 includes a PCI Interface 145, a Dedicated Processor 155, a Medium Access Controller (MAC) 165, a Dedicated Memory 160, and an ETHERNET Interface 170 to interface to an ETHERNET Network 172. Software Driver 119 for NIC 150 communicates between NIC 150 and Application Program 117 executing on CPU 110. An Application Memory Space 125, TCP Stack Memory Space 145, and a Driver Memory Space 135 are allocated within System Memory 130.

Dedicated Processor 155 within NIC 150 is used for TCP processing in lieu of having CPU 110 execute TCP Stack 115 to perform TCP processing. Therefore NIC 150 offloads CPU 110, freeing CPU 110 processing cycles for other applications. Likewise, Dedicated Memory 160 replaces TCP Stack Memory Space 145, freeing TCP Stack Memory Space 145 for allocation to other applications. However, NIC 150, including Dedicated Memory 160 and Dedicated Processor 155, is more costly than a software implementation for TCP processing executed on CPU 110.

Therefore, there is a need for a partial hardware implementation that optimizes TCP processing by offloading some tasks from a host processor and reduces system cost compared with a dedicated hardware implementation.

SUMMARY

Various embodiments of a method of the invention include processing a first portion of the frames using an offload unit to produce first processed frame data, processing a second portion of the frames using the offload unit to produce second processed frame data, and processing the second processed frame data using an application program executed on a CPU to produce third processed frame data.

Various embodiments of a method of the invention include processing delegated TCP connections using an offload unit, processing non-delegated TCP connections using an application program executing on a CPU, and processing all frames for which special cases exist using the application program executing on the CPU. The offload unit is configured to process frames for which special cases do not exist.

Various embodiments of the invention include a system for processing received frames. The system includes an application program, a TCP stack, and an offload unit. The application program is configured to process received frames stored in at least one legacy buffer. The TCP stack is configured to interface between the application program and the offload unit. The offload unit is configured to process frames received on a delegated connection to produce processed frames.

The current invention involves new systems and methods for processing data for a TCP connection.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

FIGS. 10A and 10B illustrate formats used to represent data for transmission in accordance with one or more aspects of the present invention.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 2A:
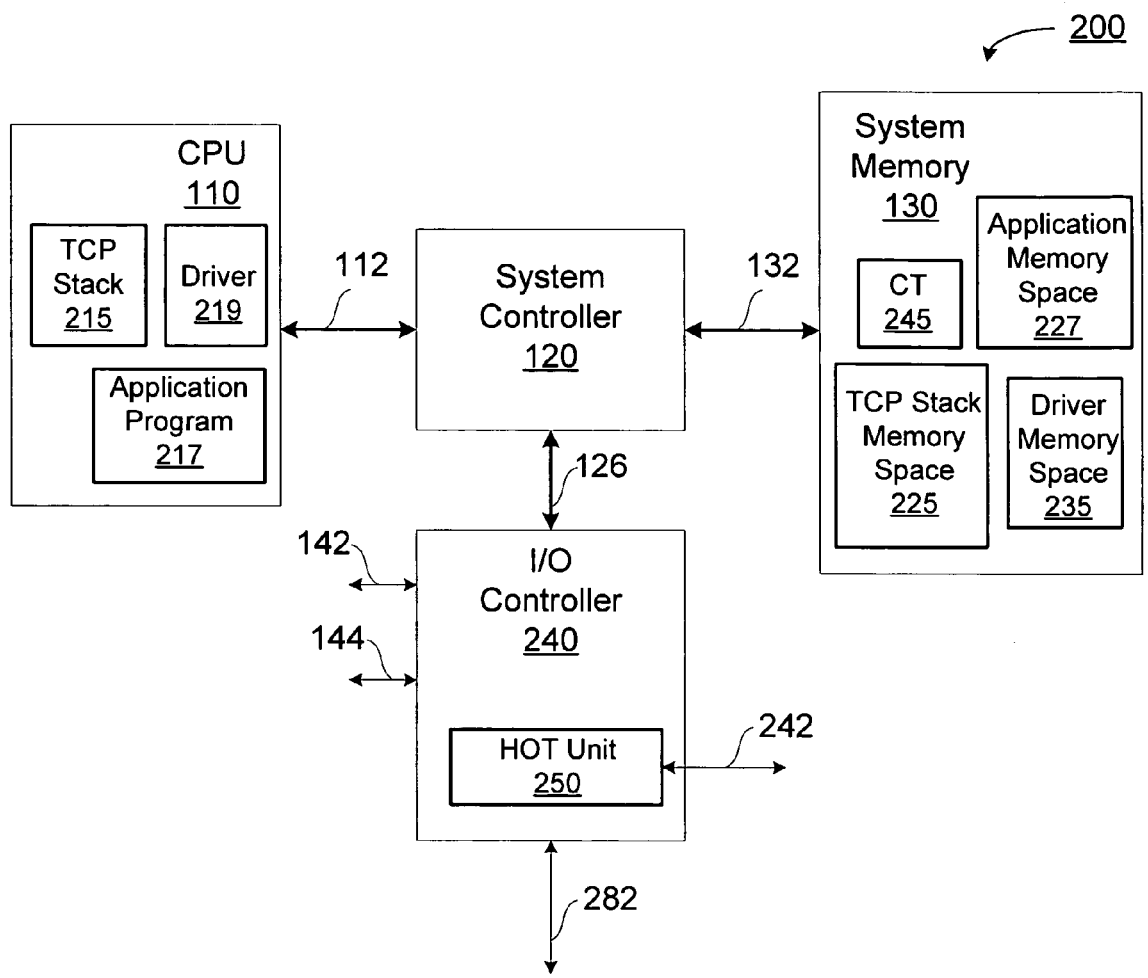
FIGS. 2A and 2B illustrate block diagrams of exemplary embodiments of computing systems including a host computer in accordance with one or more aspects of the present invention.
Figure 2B:
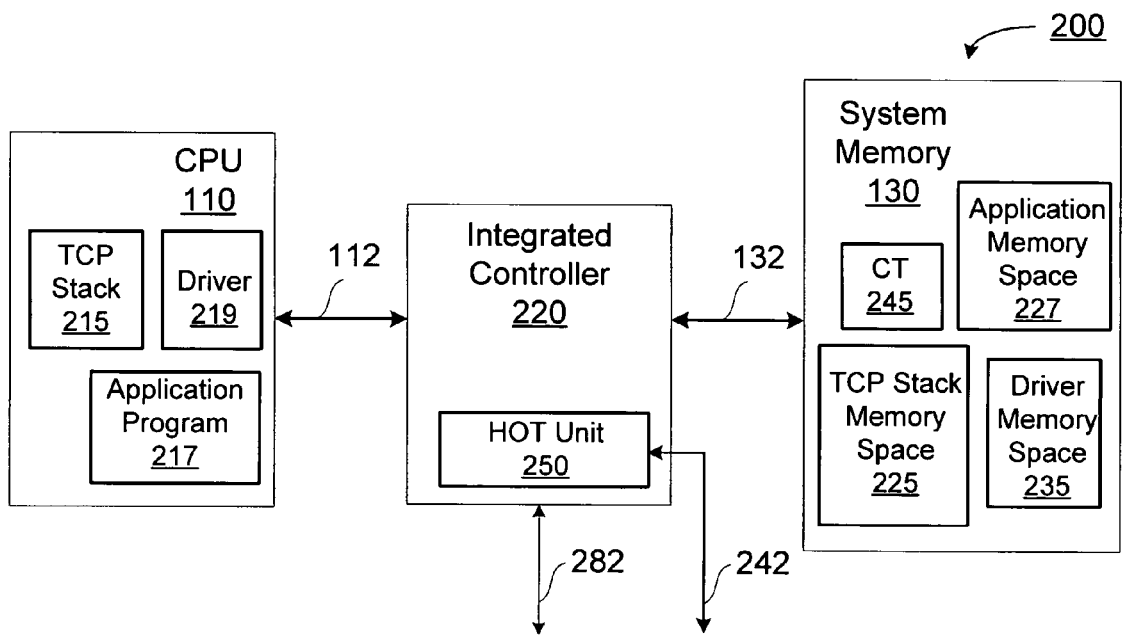

FIGS. 2A and 2B illustrate block diagrams of exemplary embodiments of Computing System 200 including CPU 110 and a Hardware Optimized TCP (HOT) Unit 250 in accordance with one or more aspects of the present invention. In FIG. 2A, offload unit HOT Unit 250 offloads some TCP processing from CPU 110. CPU 110 executes TCP Stack 215 which includes code to complete at least some of the TCP processing; specifically the TCP processing that is not performed by HOT Unit 250, as described further herein. CPU 110 is coupled to a System Controller 120 via Bus 112. System Controller 120 is coupled to System Memory 130 by System Bus 132. System Memory 130 includes TCP Stack Memory Space 225, Driver Memory Space 235, and a Connection Table (CT) 245, described further herein. System Controller 120 is coupled to an I/O Controller 240 via Hub-to-hub Interface 126.

Figure 1:
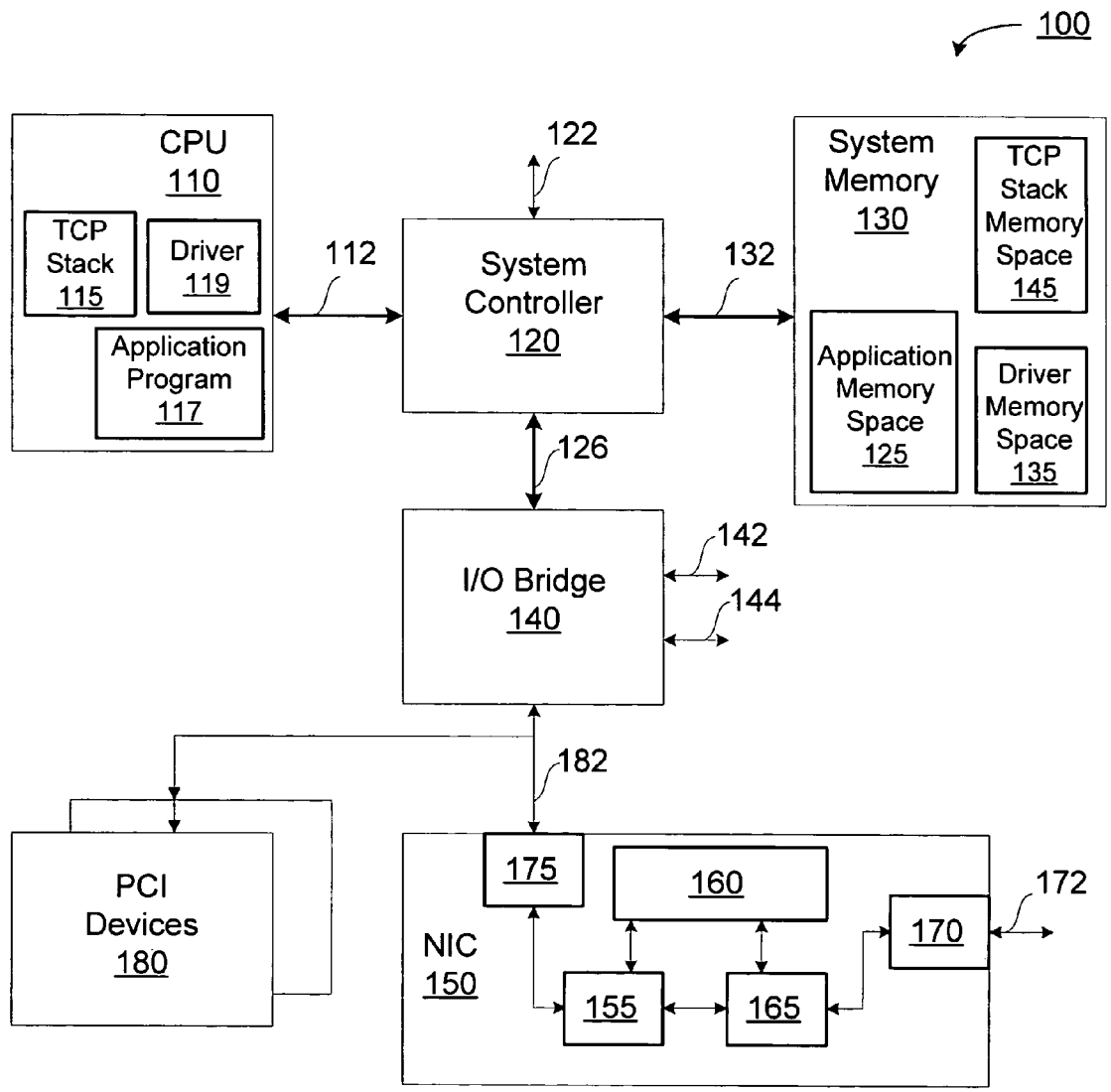
FIG. 1 is a block diagram of an exemplary embodiment of a prior art computing system including a host computer and a network interface card.

I/O Controller 240 includes a controller for PCI Bus 282 and may include controllers for System Management Bus (SMBus) 142, Universal Serial Bus (USB) 144, and the like. In an alternative embodiment, I/O Controller includes a controller for PCI Express bus. I/O Controller 240 also includes HOT Unit 250, effectively decoupling HOT Unit 250 from devices coupled to I/O Controller 240 via PCI Bus 282. Specifically, Hub-to-hub Interface 126 may be a high speed industry standard or proprietary bus coupling HOT Unit 250 to System Memory 130 via System Controller 120. Devices coupled to I/O Controller 240 share the bandwidth available on PCI Bus 282 which is typically lower than the bandwidth available on Hub-to-hub Interface 126. The location of HOT Unit 250 within I/O Controller 240 results in lower latency between HOT Unit 250 and both CPU 110 and System Memory 130 compared with latency between NIC 150 and CPU 110 shown in FIG. 1. Conventionally, low latency may be critical in communicating between a NIC, such as NIC 150 and an application program such as a software stack via a Driver 219. Low latency is particularly important for passing commands between NIC 150 and CPU 110, for example, to communicate that frame data stored in Driver Memory Space 135 is ready to be copied to Application Memory Space 125. Furthermore, because Hub-to-hub Interface 126 and Memory Bus 132 each support higher bandwidth than PCI Bus 282, HOT Unit 250 has higher bandwidth access to System Memory 130 than devices coupled to I/O Controller 240 via PCI Bus 282. Higher bandwidth access to System Memory 130 enables HOT Unit 250 to transfer received frames, sometimes referred to as "packets," to Application Memory Space 227 or Driver Memory Space 235 more quickly than a device coupled to I/O Controller 240 via a lower bandwidth bus such as PCI Bus 282.

HOT Unit 250 includes a controller interfacing to Input/Output Interface 242. Input/Output Interface 242 may couple HOT Unit 250 to a physical layer (PHY), e.g., 802.3 PHY, HPNA 1.0 PHY, HPNA 2.0 PHY, or the like. In an alternate embodiment a PHY is included within HOT Unit 250 and Input/Output Interface 242 is an ETHERNET interface such as Gigabit ETHERNET. I/O Controller 240 may be a single integrated circuit or single semiconductor platform.

FIG. 2B illustrates an alternate embodiment of Computing System 200 including an Integrated Controller 220. Integrated Controller 220 performs at least some of the functions performed by System Controller 120 and I/O Controller 240 and includes HOT Unit 250. Integrated Controller 220 may also include additional interface controllers (not shown), e.g., SMBus, USB, general purpose I/O (GPIO), integrated device electronics (IDE), and the like.

TCP Stack 215 selects one or more TCP connections as delegated connections. A delegated connection is a TCP connection processed by HOT Unit 250 with minimal intervention by TCP Stack 215. Connections that are not delegated or delegated connections that require special processing are processed entirely or partially by TCP Stack 215. TCP Stack 215 sets up a delegated connection by initializing an entry in a delegated connection table, as described further herein, within HOT Unit 250 using Driver 255 stored within System Memory 130. Driver 255 is effectively a translator between TCP Stack 215 and HOT Unit 250, issuing commands to HOT Unit 250 as requested by TCP Stack 215. Driver 255 also informs TCP Stack 215 when notifications are received from HOT Unit 250. Although communications between TCP Stack 215 and HOT Unit 250 are accomplished using Driver 255, Driver 255 may not be explicitly indicated henceforth.

Unlike the delegated connection table which only stores connection state data for delegated connections, Connection Table 245 within System Memory 130 stores connection state data for all active connections. Therefore, TCP Stack 215 may assume processing of any delegated connection as requested by HOT Unit 250. Processing a delegated connection by TCP Stack 215 is referred to as "legacy processing."

Figure 3:
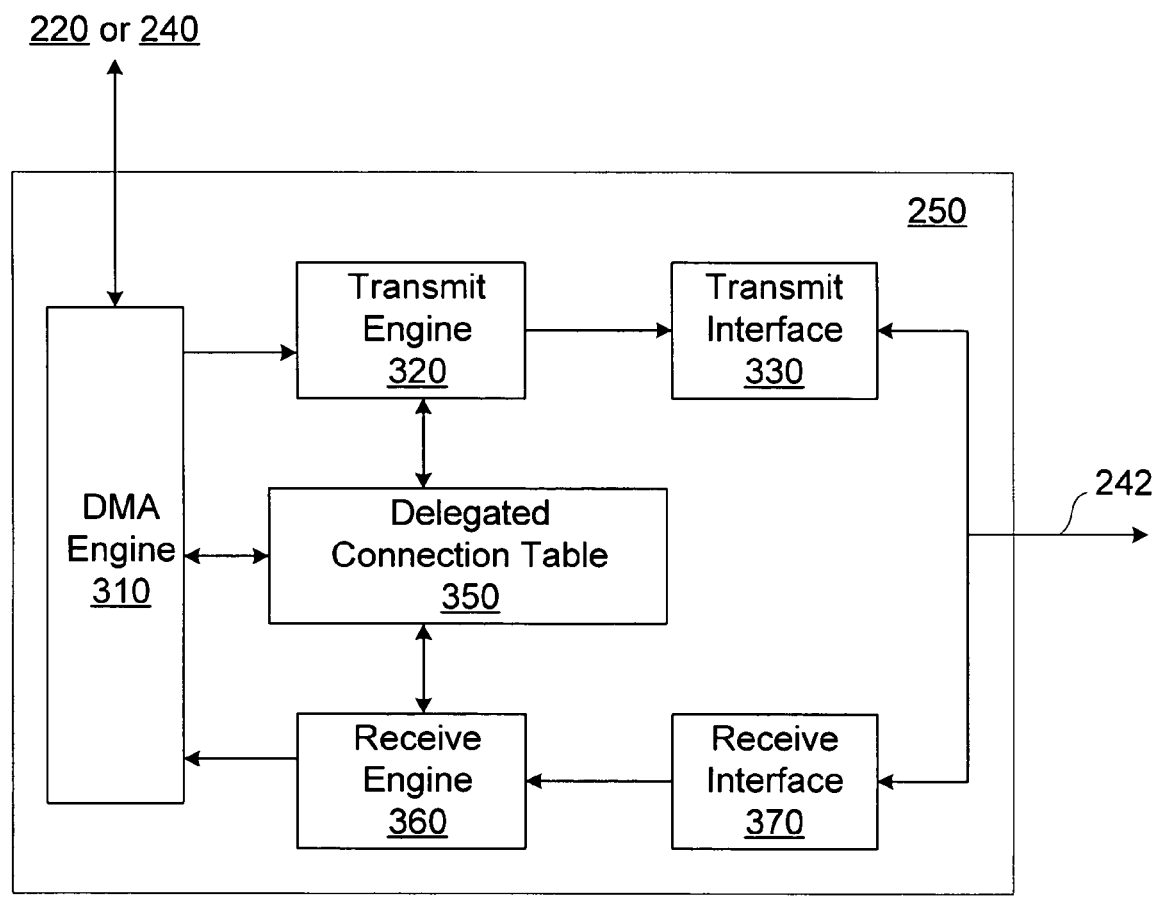
FIG. 3 illustrates the hardware optimized TCP subunit shown in FIGS. 2A and 2B in accordance with one or more aspects of the present invention.

FIG. 3 is a block diagram of HOT Unit 250 shown in FIGS. 2A and 2B in accordance with one or more aspects of the present invention. A direct memory access (DMA) interface within DMA Engine 310 interfaces one or more subunits within either I/O Controller 240 or Integrated Controller 220. The DMA interface is used to send and receive data between System Memory 130 and subunits within HOT Unit 250, and to send and receive commands between CPU 110 and subunits within HOT Unit 250.

A Transmit Engine 320 includes subunits configured to parse and edit outbound frames, including acknowledgement insertion, and checksum cyclic redundancy check computation, producing outbound frames. A Transmit Interface 330 includes one or more buffers to store outbound frames for transmission and subunits configured to interface with a PHY coupled to HOT Unit 250 via Input/Output Interface 242. In an alternate embodiment of HOT Unit 250, the PHY is integrated into HOT Unit 250. Transmit Engine 320 is coupled to a Delegated Connection Table (DCT) 350, which stores connection state data for delegated connections. Delegated Connection Table 350 is a storage resource, e.g. random access memory (RAM), a register file, or the like. At least a portion of the connection state data for delegated connections is also stored in Connection Table 245.

State information stored in Delegated Connection Table 350 may include an acknowledgement state, connection addresses, pointers to system memory buffers, connection tracking flags, event control information, transmit window size, receive window size, timestamp data, and the like. The acknowledgement state may include a sequence number of the next expected sequence number to be received, thresholds controlling the timely generation of acknowledgements, and the like. Transmit Engine 320 reads and writes portions of Delegated Connection Table 350 during frame processing using a connection table index, DCT index, to access an entry associated with a delegated connection. Connection state data stored in the entry is updated by TCP Stack 215, Transmit Engine 320, and Receive Engine 360 while the delegated connection is active, as described in relation to FIG. 7.

Receive Interface 370 includes a subunit configured to interface with the PHY coupled to HOT Unit 250 via Input/Output Interface 242. Receive Interface 370 also includes a receive FIFO (first-in first-out) buffer for storing received frames that are destined for Receive Engine 360. Receive Engine 360 uploads either a partially processed frame or just the TCP payload data to System Memory 130 via DMA Engine 310, as described further herein.

Receive Engine 360 includes subunits configured to parse the incoming frame and determine whether or not the frame is valid, i.e., computing checksums, verifying flags, and identifying the frame type, e.g., IP, UDP, TCP, and the like. When a parsed frame is not valid it is uploaded to a legacy buffer in Driver Memory Space 235 for legacy processing. If the received frame contains an IP packet with a TCP segment, the TCP Stack 215 is notified and copies the uploaded frame from the legacy buffer to Application Memory Space 227 after performing the required TCP processing.

When a parsed frame is determined to be valid, Receive Engine 360 extracts the source IP address, TCP sequence number (SN), TCP acknowledgement (ACK) number, TCP source and destination port numbers, the TCP window size, the TCP header length, and the like. Parsed frames received on non-delegated connections are uploaded to legacy buffers in Driver Memory Space 235 for processing. A parsed frame that is received on a delegated connection and that is not a special case, e.g., out-of-order sequence numbers, TCP Push flag set, and the like, is processed and the TCP payload data is uploaded to a user buffer in Application Memory Space 227. Uploading TCP payload data directly to Application Memory Space 227 is more efficient than uploading payload data through Driver Memory Space 235 since the TCP payload data does not need to be subsequently copied from Driver Memory Space 235 to Application Memory Space 227.

Figure 4A:
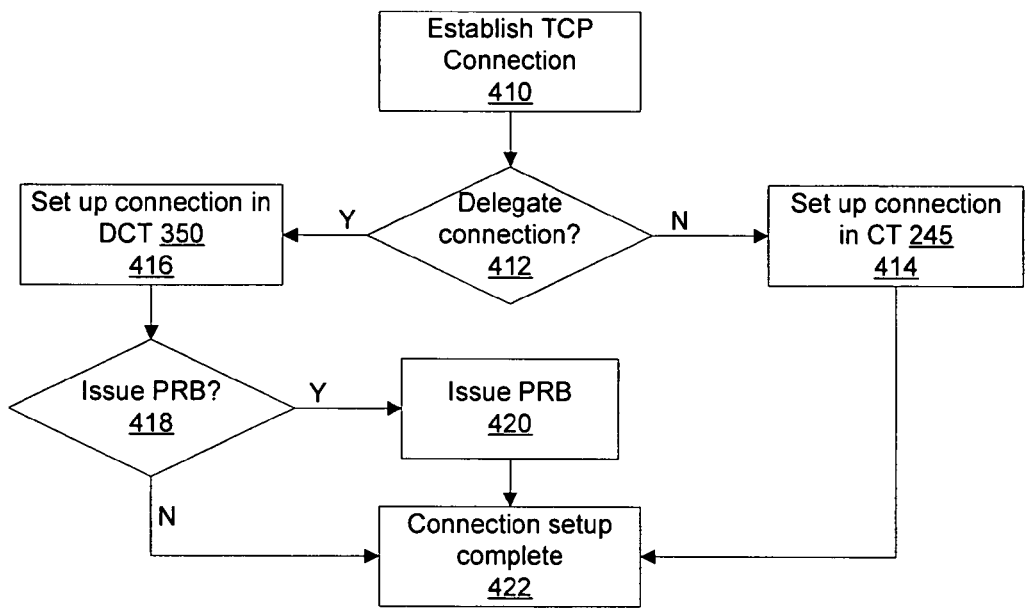
FIG. 4A illustrates an embodiment of a method of setting up a delegated connection in accordance with one or more aspects of the present invention.

FIG. 4A is a flow diagram of method steps for setting up a delegated connection, in accordance with one embodiment of the present invention. In step 410 Computing System 200 establishes a TCP connection by way of a 3-way handshake using a process known to those skilled in the art. In step 412, TCP Stack 215 determines whether or not to delegate the connection for processing by HOT Unit 250. TCP Stack 215 may determine to delegate a connection based on a characteristic of the delegated connection, such as a user-defined priority specified for the type of connection, a duration specified for the connection, a frame rate specified for the connection, whether or not the connection will be used for applications likely to perform bulk transfers, the particular TCP ports used by the connection, or the like.

If, in step 412 TCP Stack 215 determines the connection should not be delegated for processing by HOT Unit 250, then in step 414 TCP Stack 215 sets up an entry in CT 245 for processing the connection and proceeds to step 422. If, in step 412 TCP Stack 215 determines the connection should be delegated for processing by HOT Unit 250, then in step 416 TCP Stack 215 issues a command to HOT Unit 250 setting up an entry in DCT 350 with connection state data. In step 418 TCP Stack 215 determines whether or not to issue a post receive buffers (PRB) command to HOT Unit 250, as further described herein, providing HOT Unit 250 with locations and sizes, in System Memory 130, of one or more user buffers. If, in step 418 TCP Stack 215 determines a PRB command will be issued, then in step 420 TCP Stack 215 issues a PRB command. If, in step 418 TCP Stack 215 determines a PRB command will not be issued, then TCP Stack 215 proceeds to step 422. In step 422 connection setup is complete.

Figure 4B:
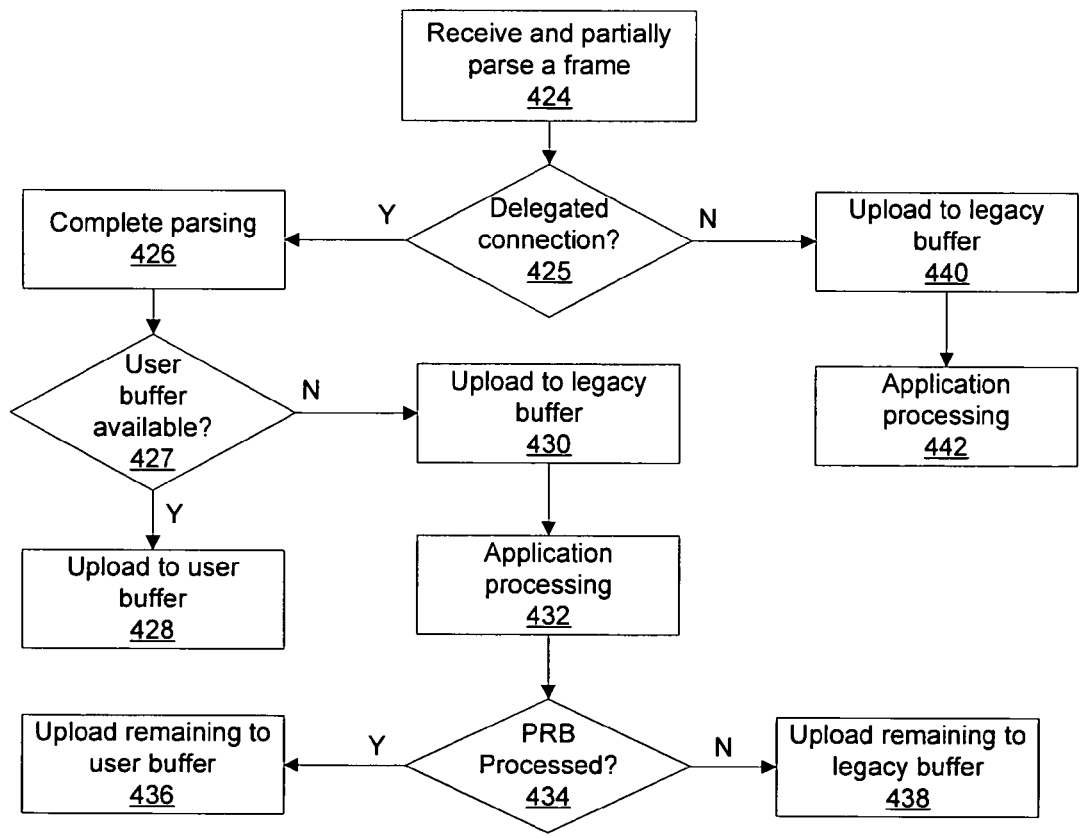
FIG. 4B illustrates an embodiment of a method of receiving a frame in accordance with one or more aspects of the present invention.

FIG. 4B is a flow diagram of method steps for receiving a frame, in accordance with one embodiment of the present invention. In step 424 HOT Unit 250 receives a frame via Input/Output Interface 242 and may partially process the frame producing a partially parsed frame and header data. In step 425 HOT Unit 250 determines if the frame was received on a delegated connection, and, if not, in step 440 HOT Unit 250 uploads the partially processed frame including its complete set of data link layer and network layer protocol header data to one or more legacy buffers. In step 442 TCP Stack 215 processes the partially processed frame uploaded to the legacy buffer.

If, in step 425 HOT Unit 250 determines the frame was received on a delegated connection, then in step 426 HOT Unit 250 completes parsing of the frame, extracting the TCP payload data. In step 427 HOT Unit 250 determines if a user buffer is available, and, if so, then in step 428 HOT Unit 250 uploads the TOP payload data to one or more user buffers. If, in step 427 HOT Unit 250 determines a user buffer is not available, then in step 430 HOT Unit 250 uploads a portion of the payload data to a legacy buffer and notifies TOP Stack 215. In one embodiment the portion is specified by a "startup limit" value stored in the entry in the DOT 350 corresponding to the delegated connection. The "startup limit" is a variable that may take a maximum value equal to the maximum receive frame size and a minimum value as determined by Application Program 217 or TOP Stack 215.

In step 432 TCP Stack 215 processes the portion of the TCP payload data uploaded to the legacy buffer. In step 434 HOT Unit 250 determines if one or more PRB commands issued by TCP Stack 215 for the delegated connection have been processed. In step 436 HOT Unit 350 uploads the remaining TCP payload data to one or more user buffers. If, in step 434 HOT Unit 250 determines one or more PRB commands for the delegated connection have not been processed, then in step 438 HOT Unit 250 uploads the remaining TCP payload data to a legacy buffer and notifies TCP Stack 215. In an alternate embodiment, TCP Stack 215 completes step 434 and in step 438 TCP Stack 215 instructs HOT Unit 250 to upload any remaining TCP payload data to a legacy buffer.

In one embodiment, message signaled interrupts (MSIs) provide a mechanism for HOT Unit 250 to use multiple interrupt vectors to signal its various interrupt sources. Utilizing MSIs enables efficiencies in interrupt handling of the host. In one embodiment, Computing System 200 uses up to eight interrupt vectors.

Figure 4C:
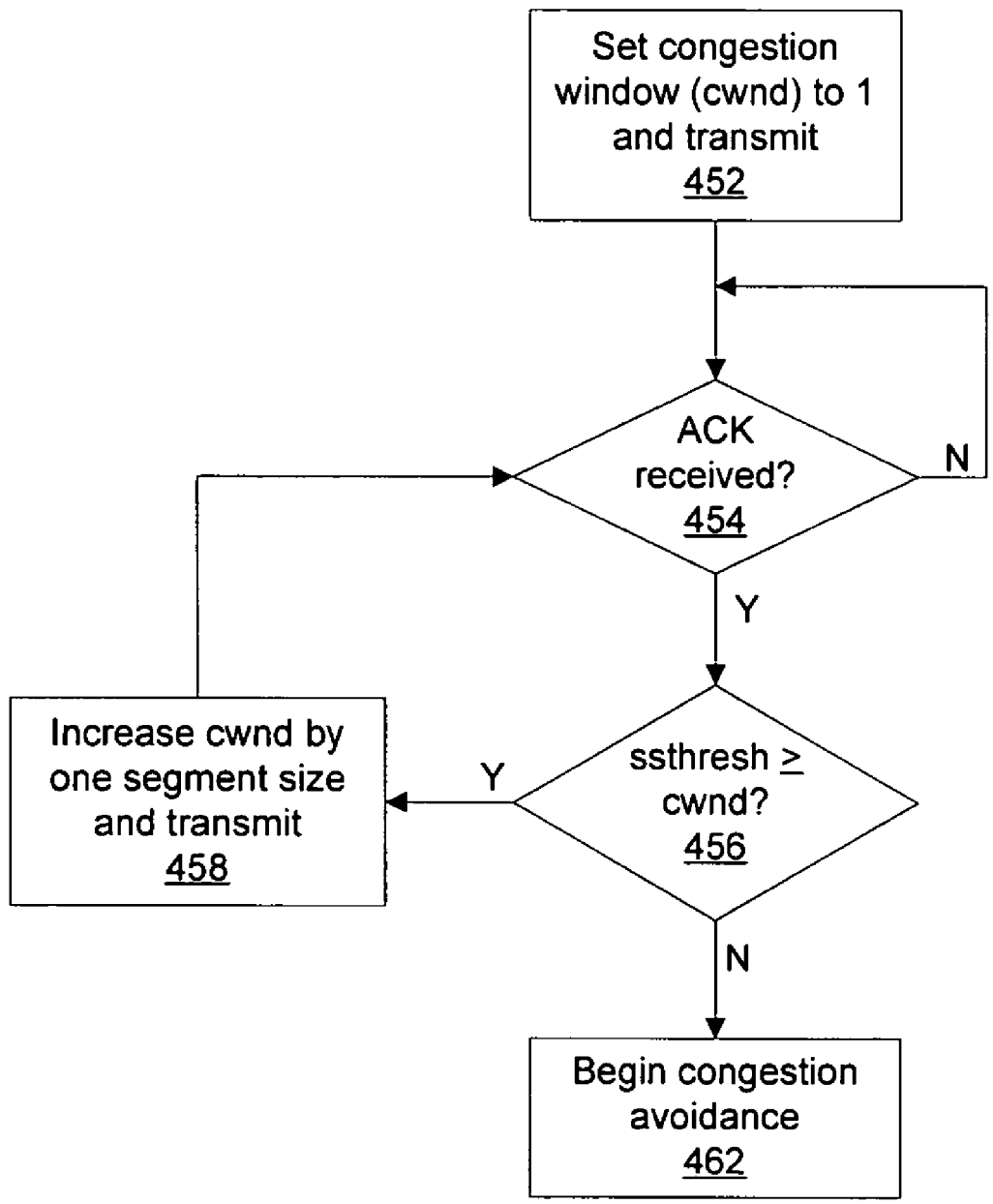
FIG. 4C illustrates an embodiment of a slow start sequence in accordance with one or more aspects of the present invention.

FIG. 4C is a flow diagram of method steps for completing a slow start sequence, in accordance with one embodiment of the present invention. The slow start and congestion avoidance algorithms are specified by the TCP protocol (as set forth in RFC 793, RFC 1122, and related documents) and are therefore well known by those skilled in the art. TCP uses slow start and congestion avoidance to determine the available bandwidth for a given connection. Two variables, ssthresh (slow start threshold) and cwnd (congestion window) determine the behavior of a delegated connection. HOT Unit 250 uploads specific ACK information, including a count of the ACKs received, to TCP Stack 215. Rather than notifying TCP Stack 215 for each received ACK, HOT Unit 250 may be configured by TCP Stack 215 to coalesce ACKs, uploading ACKs to TCP Stack 215 at a frequency specified by TCP Stack 215. Coalescing ACKs permits HOT Unit 250 to reduce the frequency at which HOT Unit 215 notifies TCP Stack 215 of status for a delegated connection, which is expected to improve performance in many cases. Specifically, utilization of CPU 110 is typically reduced because CPU 110 is not interrupted for each received ACK. Including a count of the ACKs received permits TCP Stack 215 to determine the number of ACKs that have been received for each notification to implement slow start and congestion avoidance.

Figure 6A:
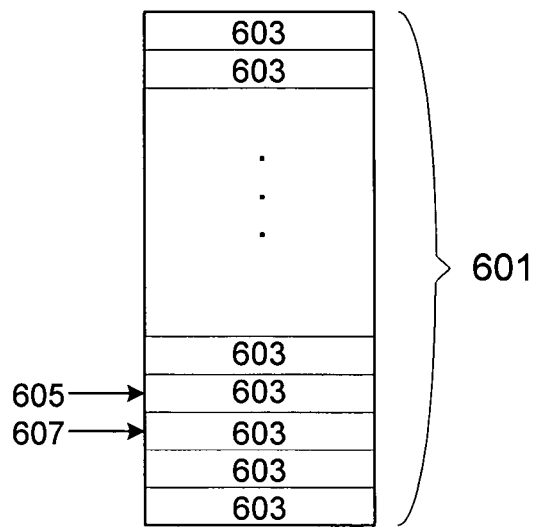
FIG. 6A illustrates a conceptual diagram of a command ring for transferring commands from an application program to an offload unit in accordance with one or more aspects of the present invention.
Figure 6B:
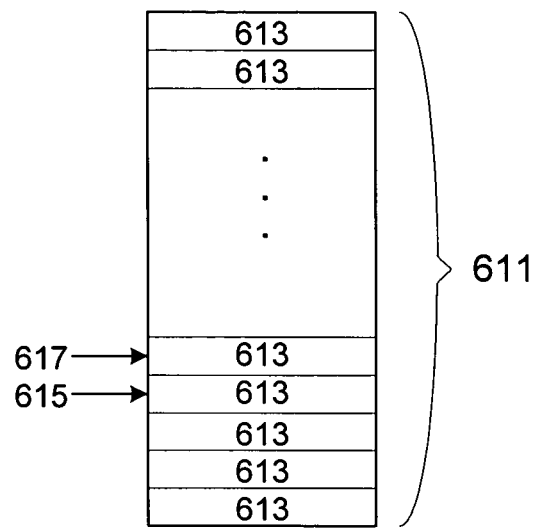
FIG. 6B illustrates a conceptual diagram of a notification ring for transferring connection information from an offload unit to an application program in accordance with one or more aspects of the present invention.
Figure 6C:
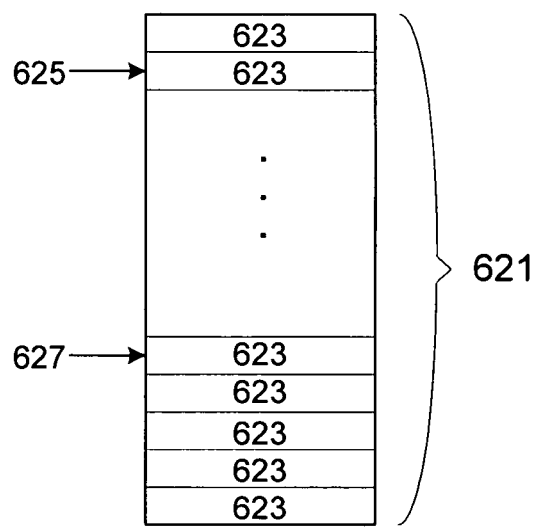
FIG. 6C illustrates a conceptual diagram of a receive descriptor ring for transferring receive buffer information from an application program to an offload unit in accordance with one or more aspects of the present invention.
Figure 6D:
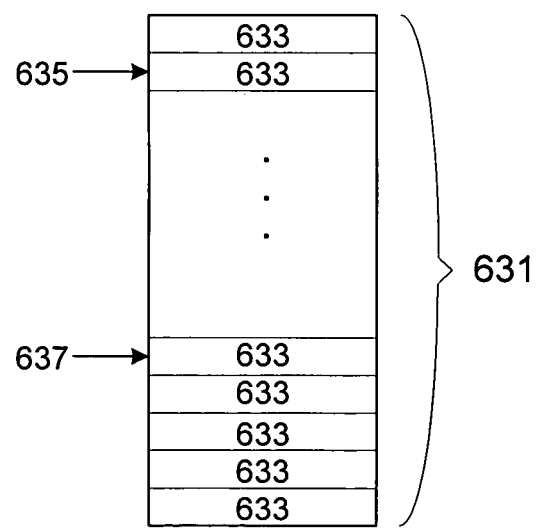
FIG. 6D illustrates a conceptual diagram of a transmit descriptor ring for transferring transmit buffer information from an application program to an offload unit in accordance with one or more aspects of the present invention.

In step 452 Application program 217 sets cwnd to 1 segment for the delegated connection and TCP Stack 215 outputs a transmit buffer descriptor to HOT Unit 250, as described further herein in relation to FIG. 6D. In step 454 HOT Unit 250 determines if an ACK was received from the destination.

HOT Unit 250 remains in step 454 until the ACK is received and then HOT Unit 250 notifies TCP Stack 215 and proceeds to step 456. In one embodiment HOT Unit 250 outputs a count of received ACKs to TCP Stack 215 and TCP Stack 215 may compute the number of ACKs received for a delegated connection between each notification.

In step 456 TCP Stack 215 determines if cwnd is greater than or equal to ssthresh for the delegated connection, and if so, then in step 458 TCP Stack 215 exponentially increases, i.e., opens, the cwnd based on the number of ACKs received for the delegated connection. In step 458 TCP Stack 215 also outputs a transmit buffer descriptor to HOT Unit 250 and returns to step 454.

In one embodiment in step 458 TCP Stack 215 configures HOT Unit 250 to notify TCP Stack 215 for each received ACK. In an alternate embodiment TCP Stack 215 configures HOT Unit 250 to notify TCP Stack 215 for a count of received ACKs, thereby performing some ACK coalescing. If, in step 456 TCP Stack 215 determines ssthresh is less than cwnd for the delegated connection, then in step 460 TCP Stack 215 is in congestion avoidance phase. When congestion avoidance is used cwnd opens linearly, until either cwnd equals the maximum transmit window size or packets are dropped.

Figure 5A:
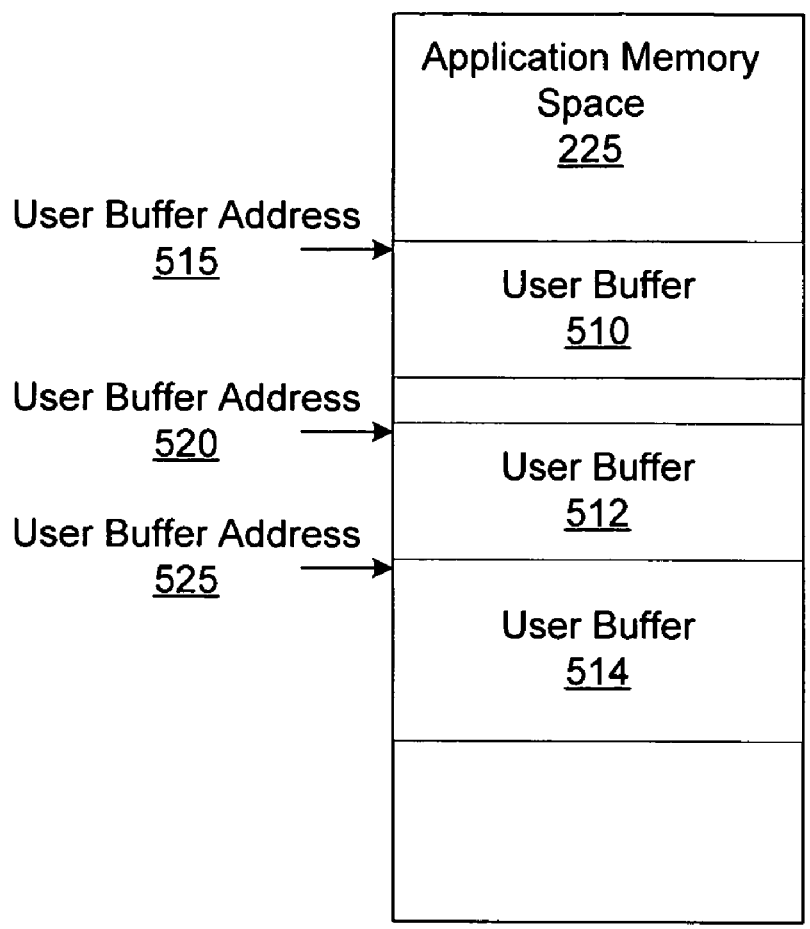
FIG. 5A illustrates an embodiment of user buffers in the application memory space shown in FIGS. 2A and 2B in accordance with one or more aspects of the present invention.

FIG. 5A illustrates an embodiment of user buffers stored in Application Memory Space 227 shown in FIGS. 2A and 2B in accordance with one or more aspects of the present invention. Each user buffer, such as a User Buffer 510, a User Buffer 512, or a User Buffer 514, is allocated in Application Memory Space 227 to receive payload data uploaded by HOT Unit 250. A physical memory address, such as User Buffer Address 515 indicates the location of a User Buffer 510 in Application Memory Space 227. Likewise, User Buffer Address 520 indicates the location of User Buffer 512 and User Buffer Address 525 indicates the location of User Buffer 514. User buffers may be stored in physically contiguous memory locations within Application Memory Space 227 or in physically non-contiguous memory locations within Application Memory Space 227.

Figure 5B:
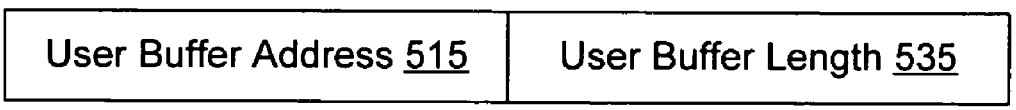
FIG. 5B illustrates an embodiment of a user buffer descriptor in accordance with one or more aspects of the present invention.

FIG. 5B illustrates an embodiment of a user buffer descriptor in accordance with one or more aspects of the present invention. Each user buffer has a corresponding length determined by the number of bytes which can be stored within the user buffer. For example the length of a User Buffer 510 is a User Buffer Length 535. A user buffer descriptor is a data structure including a user buffer address, such as a User Buffer Address 515 and a corresponding user buffer length, such as a User Buffer Length 535. In an alternate embodiment a user buffer descriptor may include descriptor flags indicating any special handling, and the like. The user buffer descriptor flags can include, among other bits, a bit requesting that HOT Unit 350 issue a notification command when payload data is uploaded to the user buffer included in the PRB command.

In a further alternate embodiment a user buffer descriptor may include any combination of a user buffer address, a user buffer length, and a user buffer end address. As previously mentioned, user buffer descriptors are provided to HOT Unit 250 by TCP Stack 215 using a PRB command. Providing physical memory addresses located in Application Memory Space 227 to HOT Unit 250 enables HOT Unit 250 to upload payload data directly to Application Memory Space 227.

Application Program 217 manages user address space which is a virtually contiguous address space allocated by an operating system. When Application Program 217 transfers the user address space information to TCP Stack 215, TCP Stack 215 requests that the operating system lock the memory corresponding to the user buffer address space. The operating system locks the amount of memory and returns one or more physical addresses (and lengths) corresponding to physically contiguous portions of System Memory 130 to TCP Stack 215. The physical address space, accessed by HOT Unit 250, is managed by TCP Stack 215 and is not necessarily physically contiguous. TCP Stack 215 translates between the user address space and the physical address space. In an alternate embodiment Driver 255 translates between the user address space and physical address space.

Figures 5C, 5D, 5E:
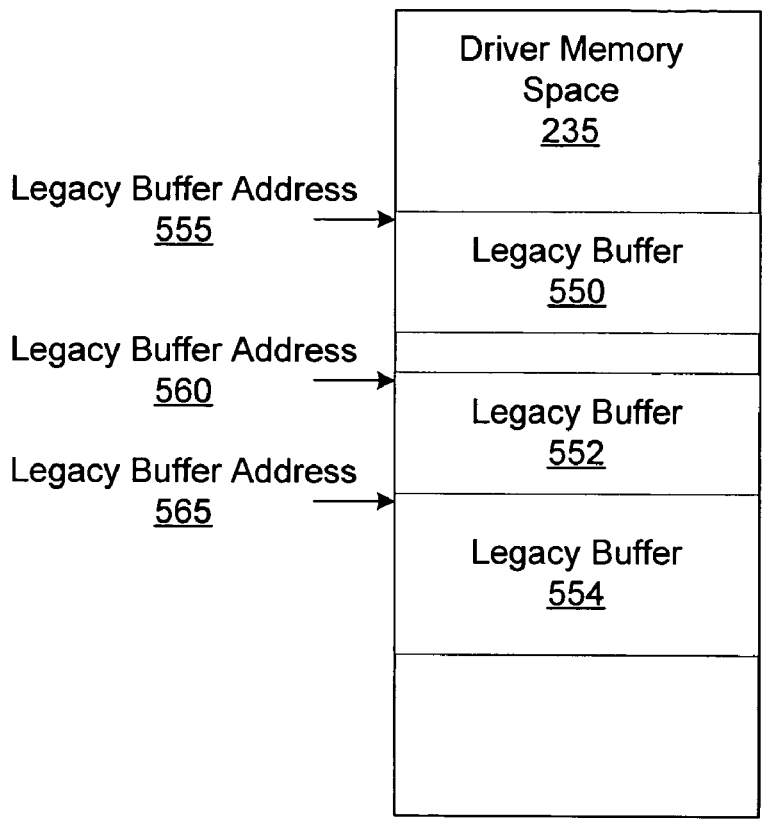
FIG. 5C illustrates an embodiment of legacy buffers in the software driver memory space shown in FIGS. 2A and 2B in accordance with one or more aspects of the present invention.
FIG. 5D illustrates an embodiment of a legacy buffer tag table in accordance with one or more aspects of the present invention.
FIG. 5E illustrates an embodiment of a legacy buffer descriptor in accordance with one or more aspects of the present invention.

FIG. 5C illustrates an embodiment of legacy buffers stored in Driver Memory Space 235 shown in FIGS. 2A and 2B in accordance with one or more aspects of the present invention. Each legacy buffer, such as a Legacy Buffer 550, a Legacy Buffer 552, or a Legacy Buffer 554, is allocated in Driver Memory Space 235 to receive partially processed frames uploaded by HOT Unit 250. A physical memory address, such as a Legacy Buffer Address 555 indicates the location of Legacy Buffer 550 in Driver Memory Space 235. Likewise, a Legacy Buffer Address 560 indicates the location of Legacy Buffer 552 and Legacy Buffer Address 565 indicates the location of Legacy Buffer 554. Legacy buffers may be stored in contiguous memory locations within Driver Memory Space 235 or in non-contiguous memory locations within Driver Memory Space 235.

FIG. 5D illustrates an embodiment of a Legacy Buffer Tag Table 590 in accordance with one or more aspects of the present invention. Each legacy buffer address is associated with a unique tag. For example, Legacy Buffer Address 555 is associated with Tag 575, Legacy Buffer Address 560 is associated with Tag 580, and Legacy Buffer Address 565 is associated with Tag 585. Legacy Buffer Tag Table 590 is maintained by Driver 255 and may be stored in Driver Memory Space 235 in one embodiment or in TCP Stack Memory Space 225 in another embodiment.

FIG. 5E illustrates an embodiment of a legacy buffer descriptor in accordance with one or more aspects of the present invention. Each legacy buffer has a corresponding length determined by the number of bytes which can be stored within the legacy buffer. For example the length of Legacy Buffer 550 is a Legacy Buffer Length 570. In an alternate embodiment, the lengths of all legacy buffers are equal. A legacy buffer descriptor is a data structure including a legacy buffer address, such as Legacy Buffer Address 555, a corresponding legacy buffer length, such as Legacy Buffer Length 570, and a corresponding tag, such as Tag 575. In an alternate embodiment a legacy buffer descriptor may include any combination of a legacy buffer address, a legacy buffer length, a tag, and a legacy buffer end address. Legacy buffer descriptors are provided to HOT Unit 250 by Driver 255 using a receive (buffer) descriptor ring, as further described in relation to FIG. 6C.

Communication between Driver 255 and HOT Unit 250 is accomplished through data structures stored in Driver Memory Space 235. A ring is a data structure that includes several entries, as described further herein. A ring is organized as a circular queue of the entries with a pointer used by Driver 255 and another pointer used by HOT Unit 250. Each ring is stored in contiguous physical memory in Driver Memory Space 235.

FIG. 6A illustrates a conceptual diagram of a Command Ring 601 for transferring commands from Driver 255 to HOT Unit 250 and for transferring status from HOT Unit 250 to Driver 255. Command Ring 601 is used to initialize delegated connection entries in DCT 350 and to provide user buffer descriptors to DCT 350. Command Ring 601 includes several entries, each entry shown in FIG. 6A as a Command Ring Entry 603. Each Command Ring Entry 603 includes an "own" bit indicating the entry is owned by either HOT Unit 250 or Driver 255. At startup, the "own" bit in each entry is initialized to indicated the entries are owned by Driver 255 and a Command Write Pointer 607 and Command Read Pointer 605 are the same entry in Command Ring 601. When TCP Stack 215 writes a command to an entry via Driver 255, the "own" bit is set to indicate that the entry is owned by Hot Unit 250 and Command Write Pointer 607 is modified to point to the next Command Ring Entry 603 within Command Ring 601. When HOT Unit 250 reads and completes processing, an entry addressed by Command Read Point 605 the "own" bit is set to indicate that the entry is owned by Driver 255. Command Read Pointer 605 is not permitted to pass Command Write Pointer 607. When either Command Read Pointer 605 or Command Write Pointer 607 reaches the last entry in Command Ring 601, the pointer wraps to the first entry in Command Ring 601. Those skilled in the art understand that other mechanisms may be used to communicate commands to HOT Unit 250, e.g., a linked list of commands, a FIFO, a shared memory scheme, or the like.

In addition to the "own" bit, each Command Ring Entry 603 includes a command field, a DCT index, command-specific control and/or status information, command-specific data, and the like. As was previously mentioned, the DCT index identifies an entry in DCT 350 corresponding to a delegated connection. The command field includes a command identifier for a command such as, a PRB command, an update table entry (UTE) command, an invalidate table entry (ITE) command, a dump connection buffer table entry (DCBTE) command, and the like. When a command is written by Driver 255 the command specific control/status information includes command specific control. When a command is read and updated by HOT Unit 350, the command specific control/status information is updated to include command specific status. The command specific data is written by Driver 255 and read by HOT Unit 350, as described further herein.

The PRB command is used by Application Program 217 to pass user buffer descriptors to HOT Unit 350, via TCP Stack 215 and Driver 255. Each user buffer descriptor indicates a physical address in Application Memory Space 227 for HOT Unit 350 to upload payload data to. TCP Stack receives one or more user addresses and determines corresponding physical addresses for inclusion in a user buffer descriptor. TCP Stack 215 can post one or more user buffer descriptors via Driver 255 using a PRB command, on behalf of Application Program 217, for a single delegated connection table entry. Driver 255 includes the number of user buffers in the command-specific control and/or status information field within a PRB command. Because Driver 255 does not have the information necessary to determine how many of the previously posted user buffers have been uploaded to by HOT Unit 350, HOT Unit 350 writes a value in the command-specific control and/or status information field indicating the number of user buffers accepted from the PRB command.

The command-specific control and/or status information field in a PRB command also includes a "sync" bit. TCP Stack 215 requests Driver 255 to write the "sync" bit when a notification command including an asserted legacy flag, as described further herein in relation to FIG. 9B, has been received from HOT Unit 350 via Notification Ring 611.

The command-specific data field in a PRB command constructed by Driver 255 includes a starting TCP sequence number corresponding to the first byte of the first buffer posted in the PRB command, a user buffer descriptor for each user buffer included in the PRB command, and the like. A user buffer descriptor includes a physical address specifying a location in Application Memory Space 227, the length of the user buffer, descriptor flags indicating any special handling, and the like.

The UTE command is used by Driver 255 to update an entry in DCT 350 and is used to setup a delegated connection and update connection data while a delegated connection is active. The ITE command is used to invalidate a delegated connection. When HOT Unit 250 receives an ITE command it waits, if necessary, for processing by Transmit Engine 320 and Receive Engine 360 to complete (while blocking any new TCP processing from starting) before clearing the delegated connection corresponding to the DCT index specified in the ITE command. The DCBTE command causes HOT Unit 350 to upload a portion of an entry specified by the DCT index included in the DCBTE command to a legacy buffer.

Driver 255 can access Command Ring 601 without interfering with transmit or receive processing for the PRB command. This permits Driver 255 to provide HOT Unit 350 with new user buffers in a timely manner, improving the likelihood that receive frames can be accepted by HOT Unit 350 rather than blocked.

FIG. 6B illustrates a conceptual diagram of a Notification Ring 611 for transferring event notification descriptors from HOT Unit 250 to Driver 255. Notification Ring 611 carries connection information from HOT Unit 250 to TCP Stack 215 via Driver 255. Those skilled in the art understand that other mechanisms may be used to communicate information from HOT Unit 250 to TCP Stack 215, e.g., a linked list of notification descriptors, a FIFO, a shared memory scheme, or the like.

Notification Ring 611 includes several entries, each entry shown in FIG. 6B as a Notification Ring Entry 613. Each Notification Ring Entry 613 includes an "own" bit indicating the entry is owned by either HOT Unit 250 or Driver 255. At startup the "own" bit in each entry is initialized to indicated the entries are owned by HOT Unit 250 and a Notification Write Pointer 617 and Notification Read Pointer 615 are the same entry in Notification Ring 611. When Hot Unit 250 writes a notification descriptor to an entry via Driver 255, the "own" bit is set to indicate that the entry is owned by Driver 255 and Notification Write Pointer 615 is modified to point to the next Notification Ring Entry 613 within Notification Ring 611. When Driver 255 reads and has completed processing an entry addressed by Notification Read Pointer 617, the "own" bit is set to indicate that the entry is owned by HOT Unit 250. Notification Read Pointer 617 is not permitted to pass Notification Write Pointer 615. When either Notification Read Pointer 617 or Notification Write Pointer 615 reaches the last entry in Notification Ring 611, the pointer wraps to the first entry in Notification Ring 611.

In addition to the "own" bit, each Notification Ring Entry 613 includes a notification flags field, a DCT index, an optional tag that, if present, provides a reference to a particular legacy buffer, the next expected sequence number, the highest received ACK number, the most recently received transmit window size, current TCP timestamp, and the like, for the delegated connection specified by the DCT index. The notification flags field includes a "legacy" flag, a "push notification" flag, a "duplicate ACK" flag, a "sequence number threshold" flag, an "ACK threshold" flag, a "request buffer" flag, and the like. The "legacy" flag is asserted when payload data or partially parsed frame data has been uploaded by HOT Unit 250 to a legacy buffer. The function of the "push notification" flag, the "duplicate ACK" flag, the "sequence number threshold" flag, the "ACK threshold" flag, and the "request buffer" flag are described in relation to FIG. 9A.

Figure 8A:
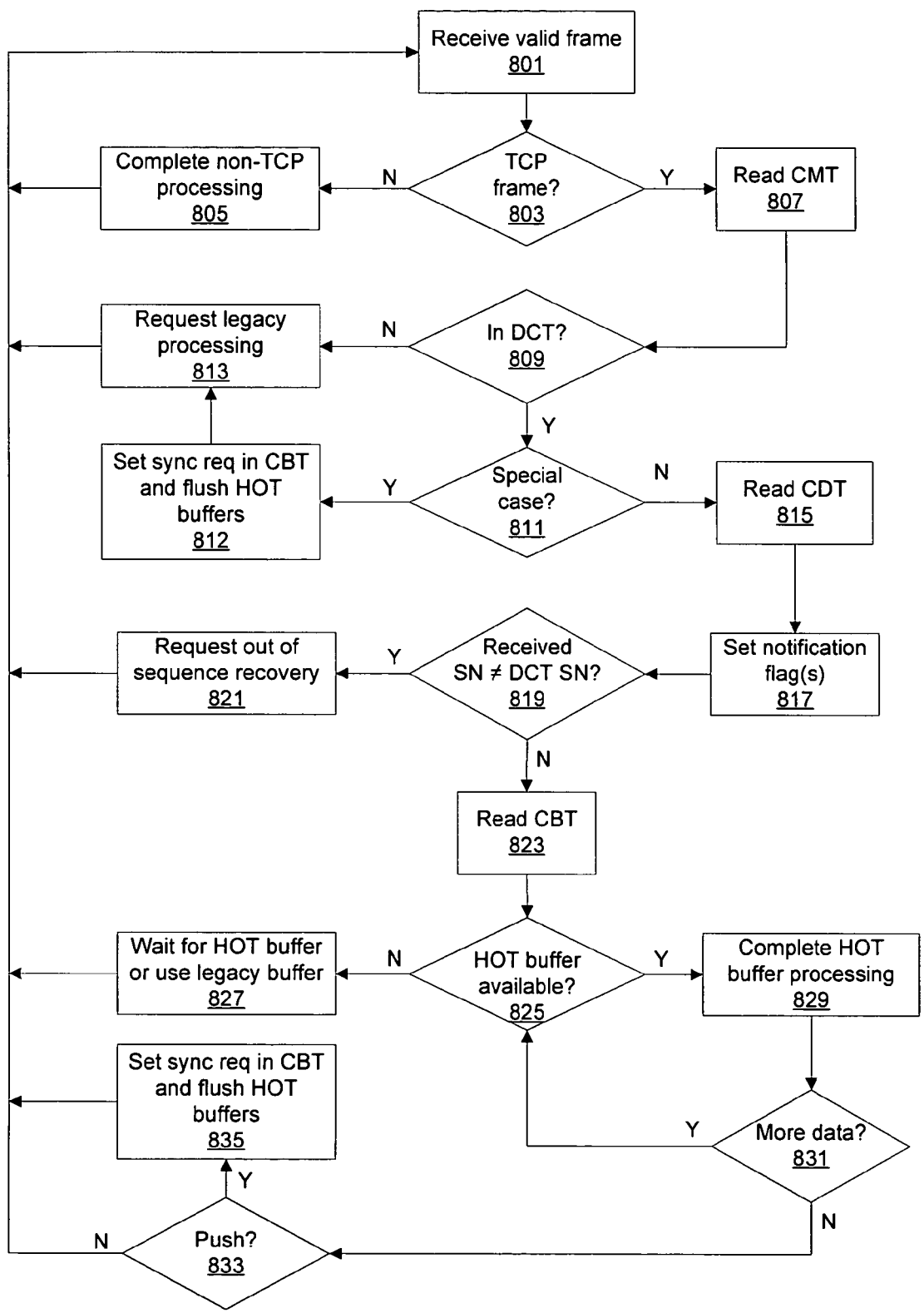
FIG. 8A illustrates an embodiment of a method of processing a valid frame in accordance with one or more aspects of the present invention.
Figure 8B:
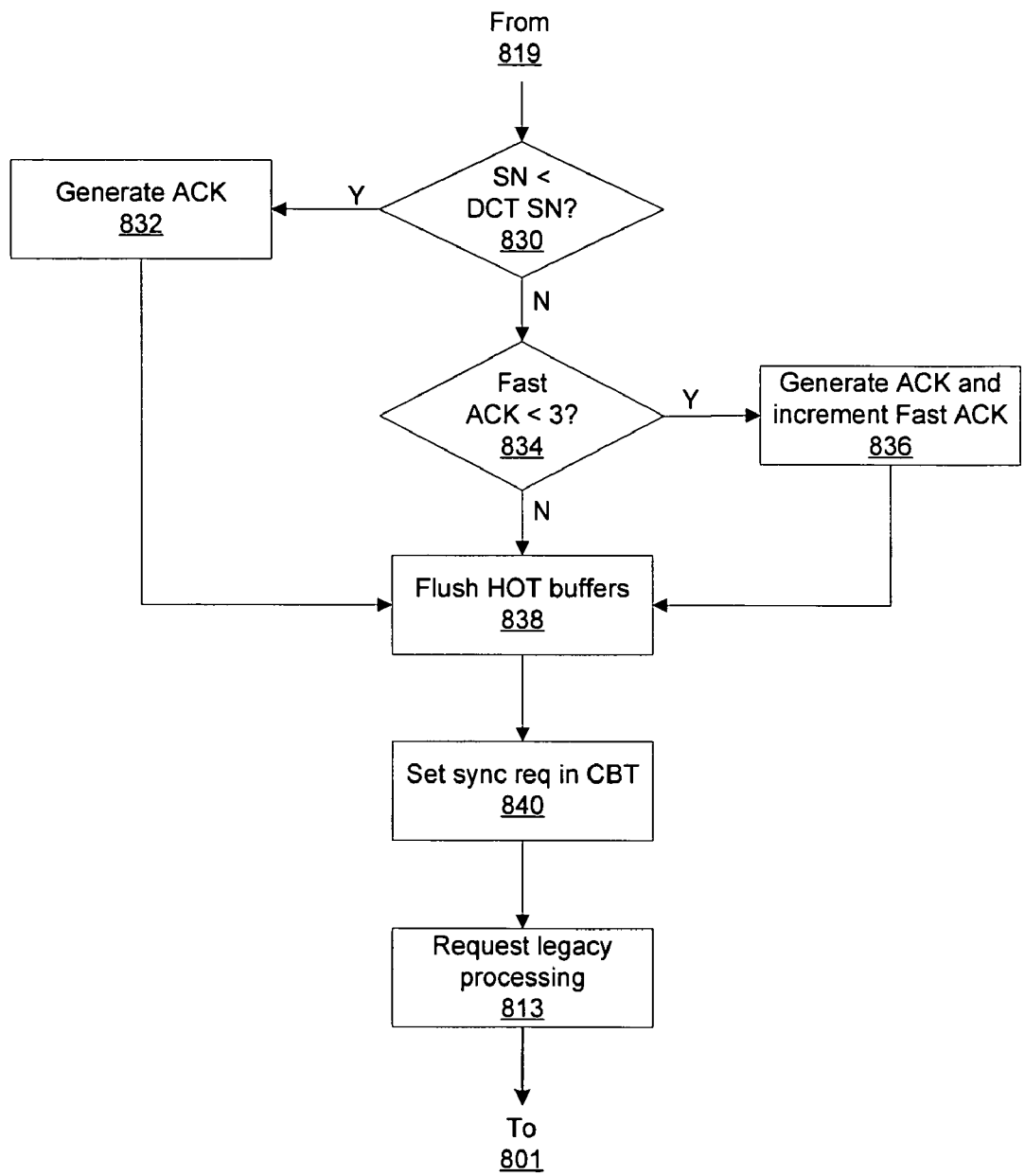
FIG. 8B illustrates an embodiment of a method of processing out-of-sequence frames in accordance with one or more aspects of the present invention.
Figure 8C:
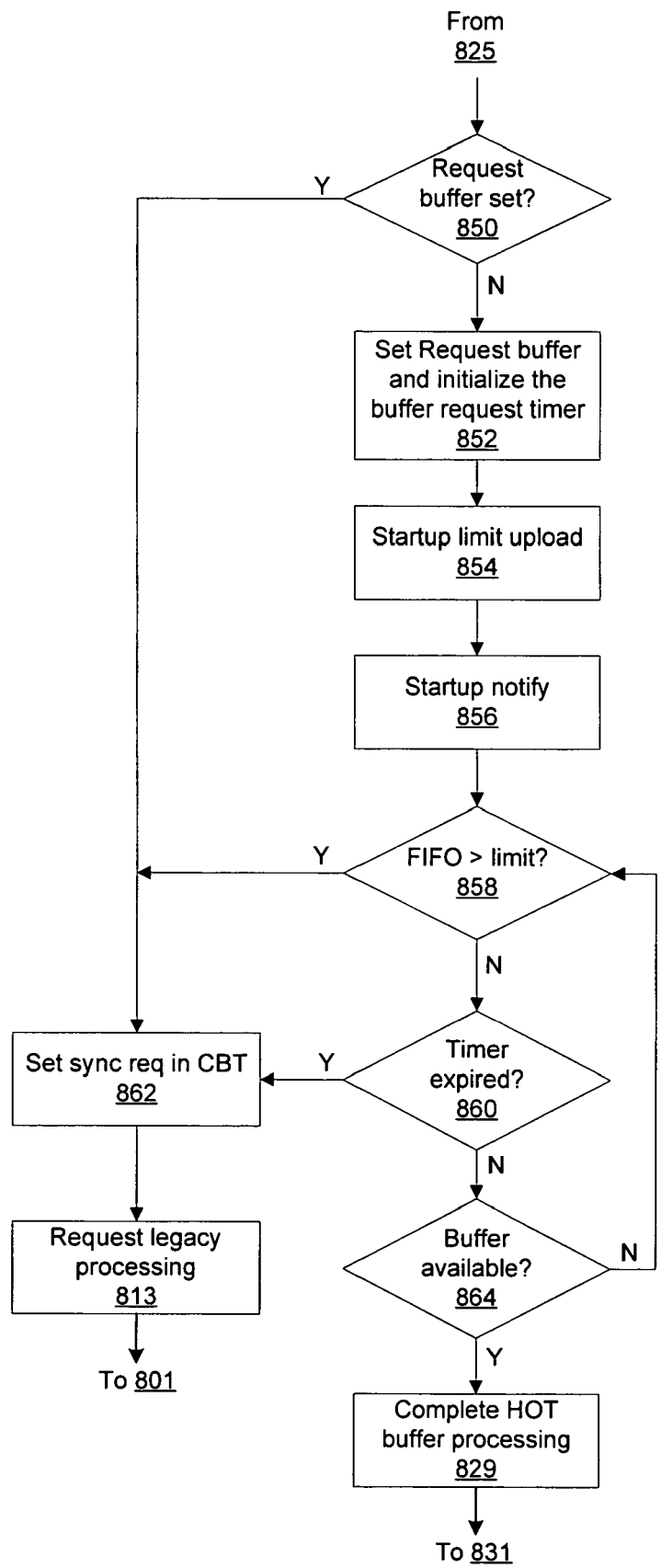
FIG. 8C illustrates an embodiment of a method of waiting for a user buffer in accordance with one or more aspects of the present invention.

The optional tag is included when HOT Unit 250 uploads payload data or partially parsed frame data to a legacy buffer, as described further herein in relation to FIG. 8C. The tag is received from Driver 255 via the receive descriptor ring, described further herein, and is used to associate a given notification with the legacy buffer into which payload data or partially parsed frame data was uploaded. Driver 255 may use the tag received with a notification to locate the legacy buffer in Driver Memory Space 235 by reading the entry in Legacy Buffer Tag Table 590 associated with the tag.

HOT Unit 250 can use Notification Ring 611 to inform Driver 255 in a timely manner of connection conditions requiring further processing by Driver 255 with minimal impact, if any, on transmit or receive processing by HOT Unit 250. The operation of the Notification Ring 611 permits Driver 255 to provide HOT Unit 350 with new user buffers in a timely manner, improving the likelihood that received frames can be accepted by HOT Unit 350 rather than blocked.

FIG. 6C illustrates a conceptual diagram of a Receive Descriptor Ring 621 for transferring receive buffer information from TCP Stack 215 via Driver 255 to HOT Unit 250 in accordance with one or more aspects of the present invention. Receive Descriptor Ring 621 is used to provide legacy buffer descriptors to HOT Unit 250. Several types of data can be uploaded by HOT Unit 250 to legacy buffers, including non-TCP frames, frames received on non-delegated connections, frames received on delegated connections which included an anomaly (unexpected flags, out-of-sequence, invalid checksum, and the like), and connection data uploaded from DCT 350. Those skilled in the art understand that other mechanisms may be used to provide buffer descriptors to HOT Unit 250, e.g., a linked list of buffer descriptors, a FIFO, a shared memory scheme, or the like.

Receive Descriptor Ring 621 includes several entries, each entry shown in FIG. 6C as a Receive Descriptor Ring Entry 623. Each Receive Descriptor Entry 623 includes an "own" bit indicating the entry is owned by either HOT Unit 250 or Driver 255. Functionality of the "own" bit is as described in relation to FIG. 6A. Functionality of Receive Descriptor Write Pointer 627 is the same as Command Write Pointer 607 and functionality of Receive Descriptor Read Pointer 625 is the same as Command Read Pointer 605.

In addition to the "own" bit, each Receive Descriptor Ring Entry 623 includes a legacy buffer descriptor, a receive control and/or status field, and the like. As previously described in relation to FIG. 5E, a legacy buffer descriptor includes a physical address specifying a location in Driver Memory Space 235, a legacy buffer length, and an optional tag.

When a Receive Descriptor Ring Entry 623 is written by Driver 255 the Receive Descriptor Ring Entry 623 can include, among other bits, a bit requesting that HOT Unit 350 issue an interrupt when data is uploaded to the legacy buffer specified in the Receive Descriptor Ring Entry 623. When a Receive Descriptor Ring Entry 623 is read and updated by HOT Unit 350, the receive control and/or status information is updated to include connection status when payload data or parsed frame data is uploaded to a legacy buffer. The receive control and/or status information written by HOT Unit 350 for a non-delegated connection upload to a legacy buffer can include an end of receive frame indicator, exceeded maximum frame size indicator, and the like. The receive control and/or status information written by HOT Unit 350 for a delegated connection upload to a legacy buffer can include startup buffer indicator, user buffer not available indicator, end of receive frame, out-of-range ACK received indicator, and the like.

FIG. 6D illustrates a conceptual diagram of Transmit Descriptor Ring 631 for transferring transmit buffer information from TCP Stack 215 via Driver 255 to HOT Unit 250 in accordance with one or more aspects of the present invention. Transmit Descriptor Ring 631 is used to provide transmit buffer descriptors to HOT Unit 250. Those skilled in the art understand that other mechanisms may be used to provide buffer descriptors to HOT Unit 250, e.g., a linked list of buffer descriptors, a FIFO, a shared memory scheme, or the like.

Transmit Descriptor Ring 631 includes several entries, each entry shown in FIG. 6D as a Transmit Descriptor Ring Entry 633. Each Transmit Descriptor Entry 633 includes an "own" bit indicating the entry is owned by either HOT Unit 250 or Driver 255. Functionality of the own bit is as described in relation to FIG. 6A. Functionality of Transmit Descriptor Write Pointer 637 is the same as Command Write Pointer 607 and functionality of Transmit Descriptor Read Pointer 635 is the same as Command Read Pointer 605.

In addition to the "own" bit, each Transmit Descriptor Ring Entry 633 includes a transmit buffer descriptor, DCT index, transmit-specific control, a transmit control/status field, a transmit buffer byte count, and the like. A transmit buffer descriptor includes a physical address specifying a location in Application Memory Space 227 or TCP Stack Memory Space 225 where frame data for transmission is stored. HOT Unit 250 reads the frame data for transmission from Driver Memory Space 235 using the physical address. The transmit-specific control can include a request for Transmit Engine 320 to save the sequence number of the first byte of a frame in DCT 350. When an ACK is received for the frame, HOT Unit 250 may generate a notification command.

The transmit control and/or status field written by Driver 255 can include an end of transmit frame indicator, a bit enabling TCP segmentation, one or more bits enabling TCP checksum computation in HOT Unit 250, a maximum segment size for use during TCP segmentation, and the like. When a Transmit Descriptor Ring Entry 633 is read and updated by HOT Unit 250, the transmit-specific control and/or status information is updated to include transmit-specific status. Transmit-specific status can include a loss of carrier indicator, a transmit retry count, a retry error, and the like.

Figure 7:
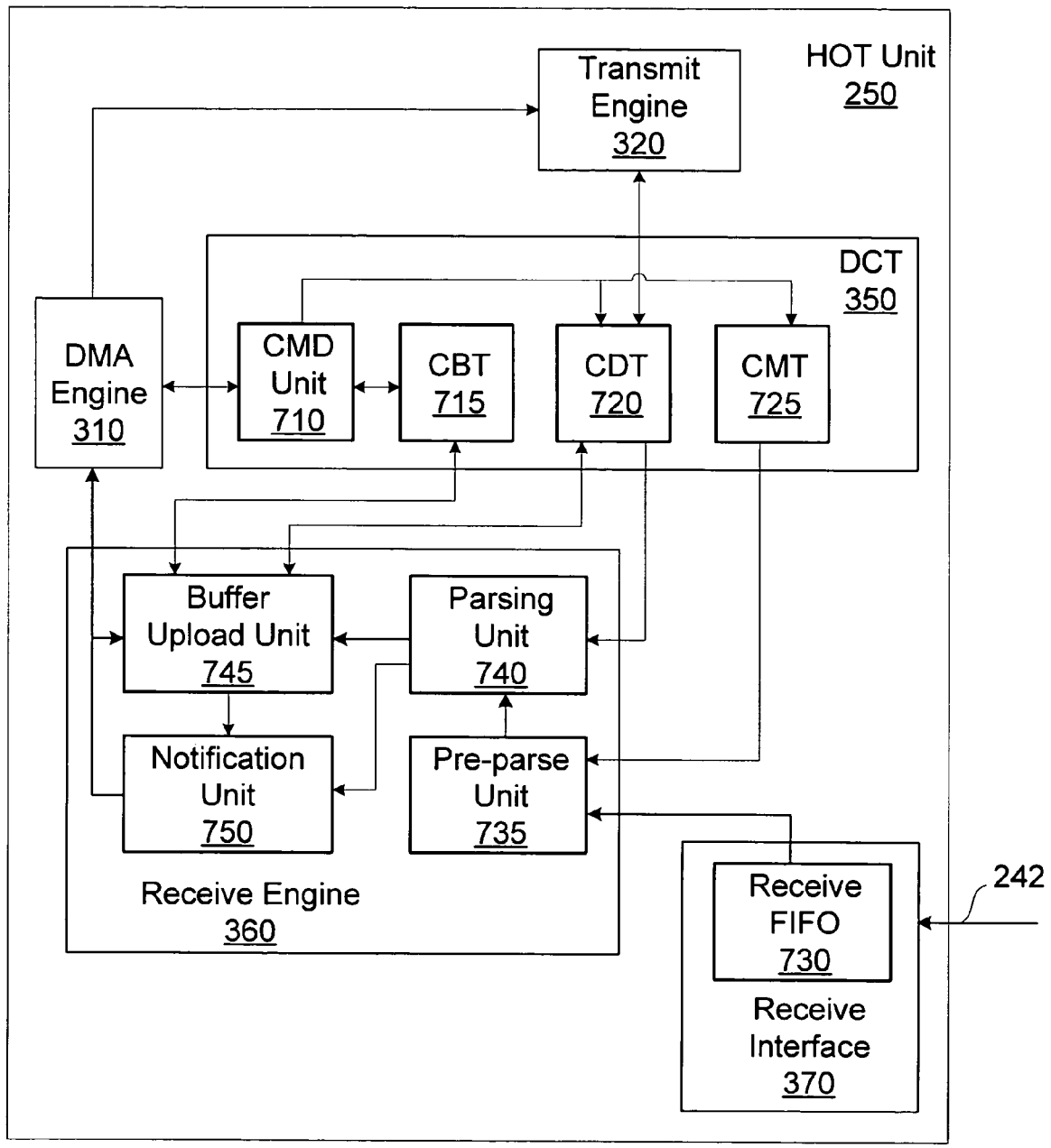
FIG. 7 illustrates a block diagram including a portion of the hardware optimized TCP subunit shown in FIG. 3 in accordance with one or more aspects of the present invention.

FIG. 7 is a block diagram including a portion of the of HOT Unit 250 shown in FIG. 3 in accordance with one or more aspects of the present invention. DCT 350 includes a CMD Unit 710 for processing commands received from Driver 255 via Command Ring 601. Delegated connection information is stored within DCT 350 in a Connection Buffer Table (CBT) 715, a Connection Data Table (CDT) 720, and a Connection Match Table (CMT) 725. Entries for a delegated connection within CBT 715, CDT 720, and CMT 725 can be written by CMD Unit 710. CMT 725 stores delegated connection identification information and CMT 725 is written to by CMD Unit 710 when a delegated connection is set up. In CMT 725, an entry corresponding to a delegated connection maintains that correspondence as long as the connection remains delegated or until the connection ends. An entry in CMT 725 includes a destination IP address, a source IP address, a source TCP port, a destination TCP port, and the like.

An entry in CDT 720 is initialized by CMD Unit 710 when a delegated connection is set up. An entry within CDT 720 includes delegated connection state information for a delegated connection, such as an expected sequence number, an ACK number, timestamp data, a count of unACKnowledged frames, and the like. Fields within the entry in CDT 720 are read and optionally modified by Transmit Engine 320 when frames are constructed for transmission on the delegated connection. Likewise, fields within the entry in CDT 720 are read and optionally modified by units within Receive Engine 360 as incoming frames on the delegated connection are processed. An entry in CBT 715 is written with one or more user buffer descriptors by CMD Unit 710 when a PRB command is received for a delegated connection. The user buffer information is read and optionally modified by a Buffer Upload Unit 745 within Receive Engine 360.

The delegated connection information has been distributed between CBT 715, CDT 720, and CMT 725 in such a manner as to decouple accesses of the state information stored in CDT 720 from user buffer postings effecting CBT 715. Furthermore, because the state information is updated by Receive Engine 360 based on the most recently received frame, Transmit Engine 320 and TCP Stack 215 can access current state information during frame construction. Likewise, because the state information is also updated by Transmit Engine 320 based on the most recently transmitted frame, Receive Engine 360 and TCP Stack 215 can access up-to-date state information during frame processing.

Within Receive Interface 370, a buffer, Receive FIFO 730 buffers incoming frames. Receive Interface 370 outputs frames and valid frame indicators to a Pre-parse Unit 735 within Receive Engine 360. Pre-parse Unit 735 parses valid frames, producing partially parsed frames, and reads CMT 725 to determine whether or not the frame was received on a delegated connection. Pre-parse Unit 735 outputs the partially parsed frames to a Parsing Unit 740. Parsing Unit 740 determines a protocol type for each partially parsed frame, e.g., TCP, UDP, IP, and the like, and optionally parses the partially parsed frames producing parsed frames and partially parsed frames. Parsing Unit 740 reads CDT 720, determines if one or more special cases exist, and outputs the partially parsed frames, parsed frames, or frames, to Buffer Upload Unit 745. Parsing Unit 740 also optionally sets notification flags, described further herein, stored in a storage element, such as a register within Notification Unit 750.

Buffer Upload Unit 745 reads CBT 715 and optionally writes CBT 715 and CDT 720. Buffer Upload Unit 745 uploads the frames, partially parsed frames, and parsed frames to System Memory 130 via DMA Engine 310. Buffer Upload Unit 745 specifies locations to write in System Memory 130 based on data stored in a user buffer descriptor stored in CBT 715 or a legacy buffer descriptor received from Driver 255 via the Receive Descriptor Ring 621. Similarly, Transmit Engine 320 specifies locations to read in System Memory 130 based on transmit buffer descriptors received from Driver 255 via the Transmit Descriptor Ring 631. Notification Unit 750 outputs notifications to Driver 255 via DMA Engine 310 to Notification Ring 611.

Delegated connection information for a limited number of connections is stored in CMT 725, and after the limited number is reached, connection information for excess connections is stored only in CT 245 (in FIG. 2A or FIG. 2B) within System Memory 130. In one embodiment, rather than accessing the connection information in CT 245 to process incoming and outgoing frames for the excess connections, HOT Unit 250 uploads partially processed frames to a legacy buffer in Driver Memory Space 235. In another embodiment, HOT Unit 250 treats DCT 350 as a cache and accesses CT 245 as needed to locate relevant connection data. TCP Stack 215 completes processing of the partially processed frames independent of processing of additional incoming or outgoing frames performed by HOT Unit 250. Therefore, legacy processing of excess connections typically proceeds at a rate that is equal or better than processing of frames in a Computing System 200 without HOT Unit 250. The rate may be better because the frames are partially processed by HOT Unit 250 and the results of frame validation performed in Receive Interface 370 are also uploaded to Driver Memory Space 235. Furthermore, legacy processing by Driver 255 and TCP Stack 215 can proceed concurrently with transmit processing by HOT Unit 250 or with receive processing by HOT Unit 250.

FIG. 8A is a flow diagram of method steps for processing a valid frame, in accordance with one embodiment of the present invention. In step 801 a valid frame is received by Pre-parse Unit 735 within Receive Engine 360. In step 803 Pre-parse Unit 735 determines if the valid frame is a TCP frame, and if not, in step 805 non-TCP processing, known to those skilled in the art is completed. In one embodiment, Receive Engine 360 completes processing of received UDP frames. In another embodiment, Receive Engine 360 completes processing of other protocols. In yet another embodiment, Receive Engine 360 uploads frames of other protocols to Driver Memory Space 235 and notifies Driver 255.

If, in step 803, Pre-parse Unit 735 determines the valid frame is a TCP frame, then in step 807, Pre-parse Unit 735 reads one or more entries from CMT 725. In step 809 Pre-parse Unit 735 determines if the TCP frame, hereafter referred to as "the frame," was received on a delegated connection, i.e., if the frame matches an entry in CMT 725. Pre-parse Unit 735 extracts the destination IP address, the source IP address, the source TCP port, and the destination TCP port from the frame and uses these values to search for a matching entry in CMT 725. A match indicates that the connection has been delegated. If, in step 809, Pre-parse Unit 735 determines the frame was not received on a delegated connection, then in step 813, legacy processing of the frame is completed. Pre-parse Unit 735 initiates legacy processing by outputting the frame to Buffer Upload Unit 745 via Parsing Unit 740 and indicating the frame was not received on a delegated connection. Buffer Upload Unit 745 uploads the at least partially parsed frame to Driver Memory Space 235 via DMA Engine 310 and notifies Driver 255 with a request for legacy processing, as described further herein.

If, in step 809, Pre-parse Unit 735 determines that the frame was received on a delegated connection, then in step 811 Pre-parse Unit 735 outputs the partially processed frame to Parsing Unit 740. In step 811 Parsing Unit 740 parses the partially processed frame, producing a parsed frame and determines if there is a special case, e.g., IP or TCP options, invalid flags, or the like, and if so, in step 812 Parsing Unit outputs the parsed frame to Buffer Upload Unit 745 indicating there is a special case. In step 812, Buffer Upload Unit 745 sets a "sync request" flag in an entry in CBT 720 corresponding to the delegated connection and flushes any user buffer descriptors in the entry in CBT 715 corresponding to the delegated connection. In step 813, Buffer Upload Unit 745 uploads the parsed frame to Driver Memory Space 235 via DMA Engine 310 and notifies Driver 255 with a request for legacy processing. Setting the "sync request" flag for a delegated connection in step 812 indicates that the delegated connection is processed using legacy processing. Receive Engine 360 does not accept user buffer descriptor commands for the delegated connection until the sync request flag is cleared by a future buffer posting event, as further described in relation to FIG. 9A.

If, in step 811 Parsing Unit 740 determines there is not a special case, then in step 815 Parsing Unit 740 reads an entry in CDT 720 corresponding to the delegated connection. In step 817 Parsing Unit 740 and Buffer Upload Unit 745 determine which, if any, notification flags stored in Notification Unit 750 are set, as further described in relation to FIG. 9A. In step 819 Parsing Unit 740 determines if a sequence number (SN) extracted from the TCP frame is not equal to a sequence number (DCT SN) stored in the entry in CDT 720 corresponding to the delegated connection, and if so, out-of-sequence recovery is requested by Parsing Unit 740 in step 821. Out-of-sequence recovery is further described in relation to FIG. 8B.

If, in step 819, Parsing Unit 740 determines the SN is equal to the DCT SN, then in step 823 Parsing Unit 740 outputs the parsed frame to Buffer Upload Unit 745. In step 823 Buffer Upload Unit 745 reads the entry in CBT 715 corresponding to the delegated connection. In step 825, Buffer Upload Unit 745 determines if a user buffer is available. The term "user buffer" is interchangeable with the term "HOT buffer". If a HOT buffer is not available, then in step 827 Buffer Upload Unit 745 either waits for a HOT buffer to become available or uploads the parsed TCP frame to a legacy buffer via DMA Engine 310, as further described in relation to FIG. 8C.

Figure 8D:
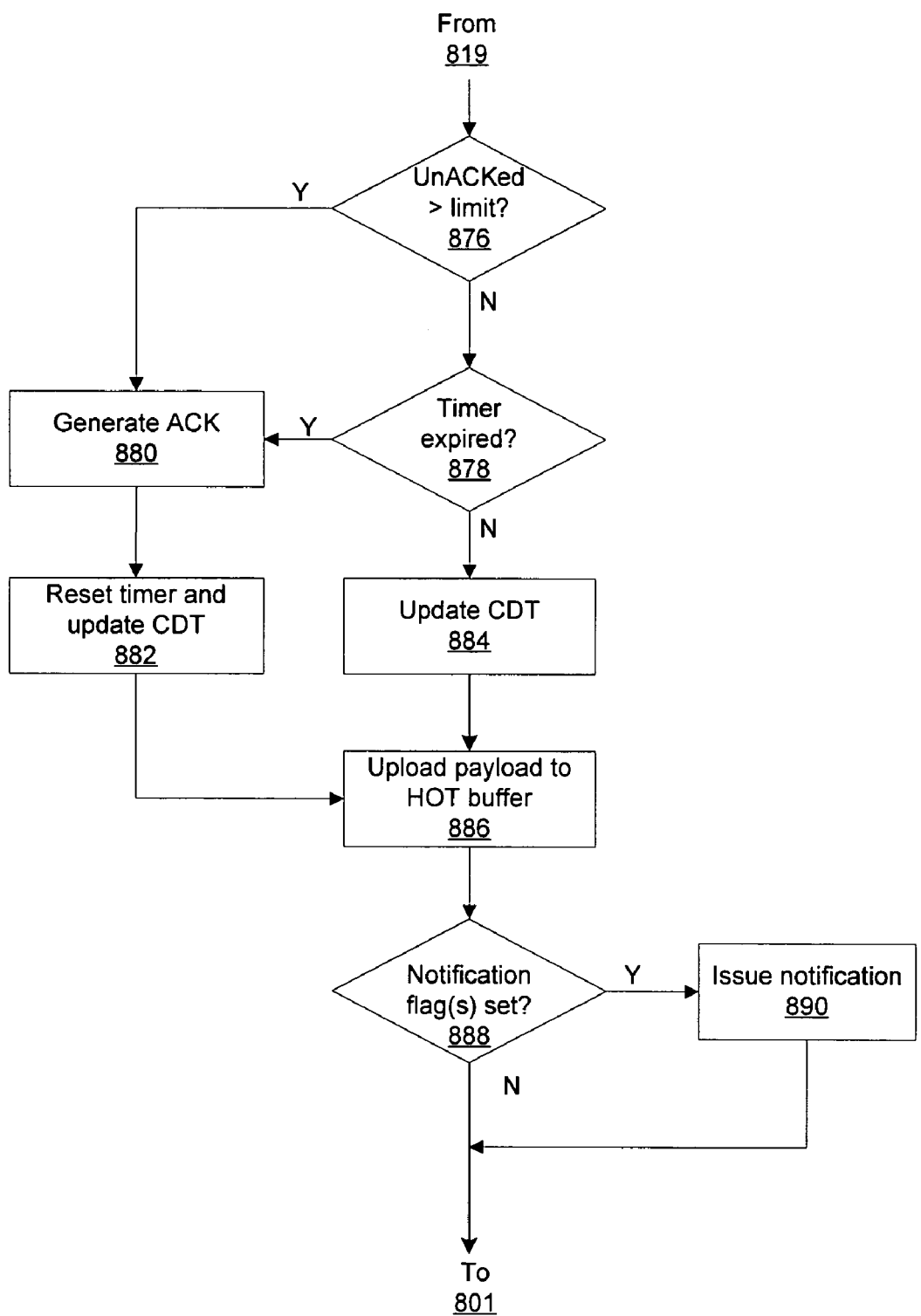
FIG. 8D illustrates an embodiment of a method of completing user buffer processing in accordance with one or more aspects of the present invention.

If, in step 825, Buffer Upload Unit 745 determines a HOT buffer is available, then in step 829 Buffer Upload Unit 745 completes processing of the parsed frame and uploads at least a portion of the payload data to the HOT buffer, as further described in relation to FIG. 8D. In step 831, after uploading a portion of the payload data to a HOT buffer, Buffer Upload Unit 745 determines if there is additional payload data in the parsed frame, and, if so, repeats steps 825 and 829. If, in step 831, Buffer Upload Unit 745 determines that all of the payload data has been uploaded to one or more HOT buffers, then in step 833 Buffer Upload Unit determines if a TCP "push" flag in the parsed frame had been asserted. If, in step 833, Buffer Upload Unit 745 determines the TCP "push" flag was asserted, Buffer Upload Unit 745 sets the "sync request" flag for the entry in CBT 715 corresponding to the delegated connection and flushes any user buffer descriptors in the entry in CBT 715 corresponding to the delegated connection. If, in step 833, Buffer Upload Unit 745 determines the TCP "push" flag is not asserted, then the Receive Engine 360 proceeds to step 801.

FIG. 8B is a flow diagram of method steps for processing out-of-sequence frames, in accordance with one embodiment of the present invention. As persons skilled in the art will understand, the method steps described with respect to FIG. 8B constitute one way of performing step 821 of FIG. 8A. Out-of-sequence recovery handles cases including a SN that is greater than what was expected based on the value stored in the DCT SN (e.g., resulting from one or more lost frames) or a SN that is less than a DCT SN (e.g., resulting from retransmission of a frame due to a transmit timeout or a lost ACK). When the SN is greater than the DCT SN, the Receive Engine 360 executes a "fast recovery" algorithm, including transmission of up to three consecutive identically constructed ACKs (each corresponding to last frame received in-sequence), invalidates (flushes) the user buffers for the delegated connection, and uploads the entire frame to one or more legacy buffers. When the SN is less than the DCT SN, the Receive Engine 360 transmits an ACK for the frame, invalidates the user buffers for the delegated connection, and uploads the entire frame to one or more legacy buffers.

In step 830 Parsing Unit 740 determines if the SN extracted from the frame is less than the DCT SN read from CDT 720 in step 815 of FIG. 8A, and if so, in step 832 Parsing Unit 740 signals Transmit Engine 320 to generate an ACK for the frame. In step 832, Parsing Unit 740 also outputs the parsed frame to Buffer Upload Unit 745 and proceeds to step 838. If, in step 830, Parsing Unit 740 determines the SN extracted from the frame is not less than the DCT SN, then in step 834, Parsing Unit 740 determines if a "Fast ACK" value read from CDT 720 in step 815 is less than 3, and if so, Parsing Unit 740 signals to Transmit Engine 320 to generate an ACK for the parsed frame in step 836. Also in step 836, Parsing Unit 740 outputs the parsed frame to Buffer Upload Unit 745 and indicates to Buffer Upload Unit 745 to increment the "Fast ACK" value stored in CDT 720.

In step 838 Buffer Upload Unit 745 flushes any HOT buffers corresponding to the delegated connection stored in CBT 715. In step 840, Buffer Upload Unit 745 sets a "sync request" flag corresponding to the delegated connection in CBT 715 and optionally updates connection state data for the delegated connection, e.g., Fast ACK, DCT SN, ACK number, and the like, stored in CDT 720. In step 813, Buffer Upload Unit 745 uploads the parsed TCP frame to Driver Memory Space 235 via DMA Engine 310 and notifies Driver 255 with a request for legacy processing.

FIG. 8C is a flow diagram of method steps for waiting for a user buffer, in accordance with one embodiment of the present invention. As persons skilled in the art will understand, the method steps described with respect to FIG. 8C constitute one way of performing step 827 of FIG. 8A. Receive Engine 360 waits for a user buffer rather than uploading a parsed frame or partially parsed frame to a legacy buffer because data uploaded user buffers does not need to be copied from Driver Memory Space 235 to Application Memory Space 227 by TCP Stack 215. Furthermore, once a delegated connection is processed using a legacy buffer, TCP Stack 215 must respond to the "sync request" flag, resulting in the "sync request" flag being cleared, before a parsed frame or a partially parsed frame for the delegated connection will be uploaded to a user buffer by the Receive Engine 360.

In step 850, Buffer Upload Unit 745 determines if a "request buffer" flag is set in the entry, read in step 823 of FIG. 8A, corresponding to the delegated connection. If the "request buffer" flag is not set, then in step 852 Buffer Upload Unit 745 sets the request buffer flag in the entry in CBT 715 corresponding to the delegated connection and initializes the buffer request timer to a value stored in a register. In an alternate embodiment the buffer request timer is initialized to a value stored in the entry in CBT 715 corresponding to the delegated connection. If, in step 850, the Buffer Upload Unit 745 determines that the "request buffer" flag is set, then Buffer Upload Unit 745 proceeds to step 862.

In step 854 Buffer Upload Unit 745 uploads a number of bytes, determined by a "startup limit" value to a legacy buffer via DMA Engine 310. The startup limit, initialized by TCP Stack 215 is stored in the entry in CDT 720 corresponding to the delegated connection. In step 856, Buffer Upload Unit 745 sets the "request buffer" flag stored in Notification Unit 750 and Notification Unit 750 issues a notification to Driver 255 via the notification ring. The notification includes the same tag value that was used in the tag field from the associate legacy buffer descriptor. Notification Unit 750 clears the notification flags after sending the notification. Techniques known to those skilled in the art are used to ensure that the parsed frame is uploaded to Driver Memory Space 235 before Driver 255 receives the corresponding notification.

In step 858 Buffer Upload Unit 745 determines if a value indicating the "fullness" of Receive FIFO 730 is greater than a limit, e.g., a "high water" mark, and, if so Buffer Upload Unit 745 proceeds to step 862. In one embodiment, the high water mark is fixed. In an alternate embodiment, the high water mark is stored in a register programmed by Driver 255. If, in step 858, Buffer Upload Unit 745 determines the value indicating the "fullness" of Receive FIFO 730 is not greater than the "high water" mark, then in step 860 Buffer Upload Unit 745 determines if a buffer request timer has expired. If, in step 860, Buffer Upload Unit 745 determines the buffer request timer has expired, then in step 862 Buffer Upload Unit 745 sets the "sync request" flag stored in CBT 715 and the legacy flag stored in Notification Unit 750. In step 813, Buffer Upload Unit 745 uploads the parsed frame to Driver Memory Space 235 via DMA Engine 310. Notification Unit 750 issues a notification to Driver 255 via the notification ring, Notification Unit 750 clears the notification flags, and Receive Engine 360 returns to step 801 in FIG. 8A. The notification includes the same tag value that was used in the tag field from the associated legacy buffer descriptor. Techniques known to those skilled in the art are used to ensure that the parsed frame is uploaded to Driver Memory Space 235 before Driver 255 receives the corresponding notification.

If, in step 860 Buffer Upload Unit 745 determines the buffer request timer has not expired, in step 864 Buffer Upload Unit 745 determines if a user buffer is available, i.e., if Application Program has posted a user buffer via the command ring. If a user buffer is not available, Buffer Upload Unit 745 returns to step 858. If a user buffer is available, Buffer Upload Unit 745 completes processing of the parsed frame and uploads the payload data to the user buffer in step 829, as further described in relation to FIG. 8D. Following step 829, Receive Engine 360 returns to step 831 of FIG. 8A.

FIG. 8D is a flow diagram of method steps for completing HOT buffer processing, in accordance with one embodiment of the present invention. As persons skilled in the art will understand, the method steps described with respect to FIG. 8D constitute one way of performing step 829 of FIG. 8A. When HOT Unit 250 receives incoming data, an ACK should be sent to a sender (destination connection) to ensure that a receive window, indicating how much data may be sent to HOT Unit 250, remains open wide enough to permit saturation of the receive path. When received frames are not ACKnowledged in a timely manner, the receive window may need to be closed, else a retransmit timer within the sender may expire, causing the sender to retransmit one or more frames.

In addition to transmitting ACKs to the sender, Driver 255 is notified as frames are received by HOT Unit 250 based on sequence numbers, timers, and the like. CDT 720 is updated by increasing DCT SN by the received TCP payload size, a count of unACKnowledged frames is incremented, and the most recently received TCP timestamp extracted from the received frame is stored in CDT 720 for the delegated connection, if the TCP timestamp option was appropriately included in the received frame.

In step 876 Parsing Unit 740 determines if the count of unACKnowledged frames is greater than an unACKnowledged frame limit, and if so, proceeds to step 880. The unACKnowledged frame limit is stored in CDT 720 for the connection and is determined by TCP Stack 215. In an alternate embodiment, Parsing Unit 740 determines if the count of unACKnowledged frames received on the delegated connection is greater than or equal to the unACKnowledged frame limit in step 876. In another alternate embodiment, Buffer Upload Unit 745 determines if the count of unACKnowledged frames is greater than the unACKnowledged frame limit.

If, in step 876, Parsing Unit 740 determines the count of unACKnowledged frames is less than or equal to the unACKnowledged frame limit, then Parsing Unit 740 determines if a transmit timer has expired in step 878. A transmit ACK timer is configured to expire before a sender's retransmit timer would expire, in order to minimize unnecessary retransmissions due to the sender not receiving timely ACKs. In one embodiment, the expiration period of the transmit ACK timer is a constant for all delegated connections. In an alternate embodiment, the expiration period of the transmit ACK timer may be programmed by TCP Stack for each delegated connection.

If, in step 878 Parsing Unit 740 determines the transmit ACK timer has expired, then Parsing Unit 740 signals Transmit Engine 320 to generate an ACK for the parsed frame in step 880 and Transmit Engine 320 outputs the parsed frame to Buffer Upload Unit 745. In step 882, Buffer Upload Unit 745 updates the unACKnowledged frame count stored in the entry in CDT 720 for the connection by setting it to zero and updates a "last ACK sent" value to the SN value extracted from the frame. Buffer Upload Unit 745 also updates connection state data such as the incremental ACK number, the incremental sequence number, and the like, and resets the transmit ACK timer before proceeding to step 886.

If, in step 878, Buffer Upload Unit 745 determines the transmit ACK timer has not expired, then Buffer Upload Unit 745 updates the entry corresponding to the delegated connection in CDT 720 in step 884, e.g., by updating the count of unACKnowledged frames, and the like.

In step 886 the payload data are uploaded by Buffer Upload Unit 745 via DMA Engine 310 to a HOT buffer TCP in Application Memory Space 227. In step 888, Notification Unit 750 determines if any notification flags are set, and, if so, in step 890, Notification Unit 750 issues a notification to Driver 255 via the notification ring. Notification Unit 750 constructs an event notification descriptor, including the notification flags, the transmit window size, SN, the last ACK number, the TCP timestamp value, the tag value from the legacy descriptor, and the like. Notification Unit 750 clears the notification flags after sending the notification.

Notification Unit 750 outputs the event notification descriptor to DMA Engine 310 which transfers the event notification descriptor to an offload event notification ring stored in Driver Memory Space 235. The offload event notification ring is organized as a circular queue in a contiguous memory block. HOT Unit 250 writes the offload event notification ring and Driver 255 reads the offload event notification ring. TCP Stack 215 may use data read from the offload event notification ring to update CT 245, thereby maintaining coherence between CT 245 and DCT 350. TCP Stack 215 may also maintain coherence between CT 245 and DCT 350 by uploading entries from CDT 715 to one or more legacy buffers.

Following step 890, Receive Engine 360 returns to step 801 to process another valid frame. If, in step 888, Notification Unit 750 determines that one or more notification flags are not set, then Receive Engine 360 returns to step 801 to process another valid frame.

Figure 9A:
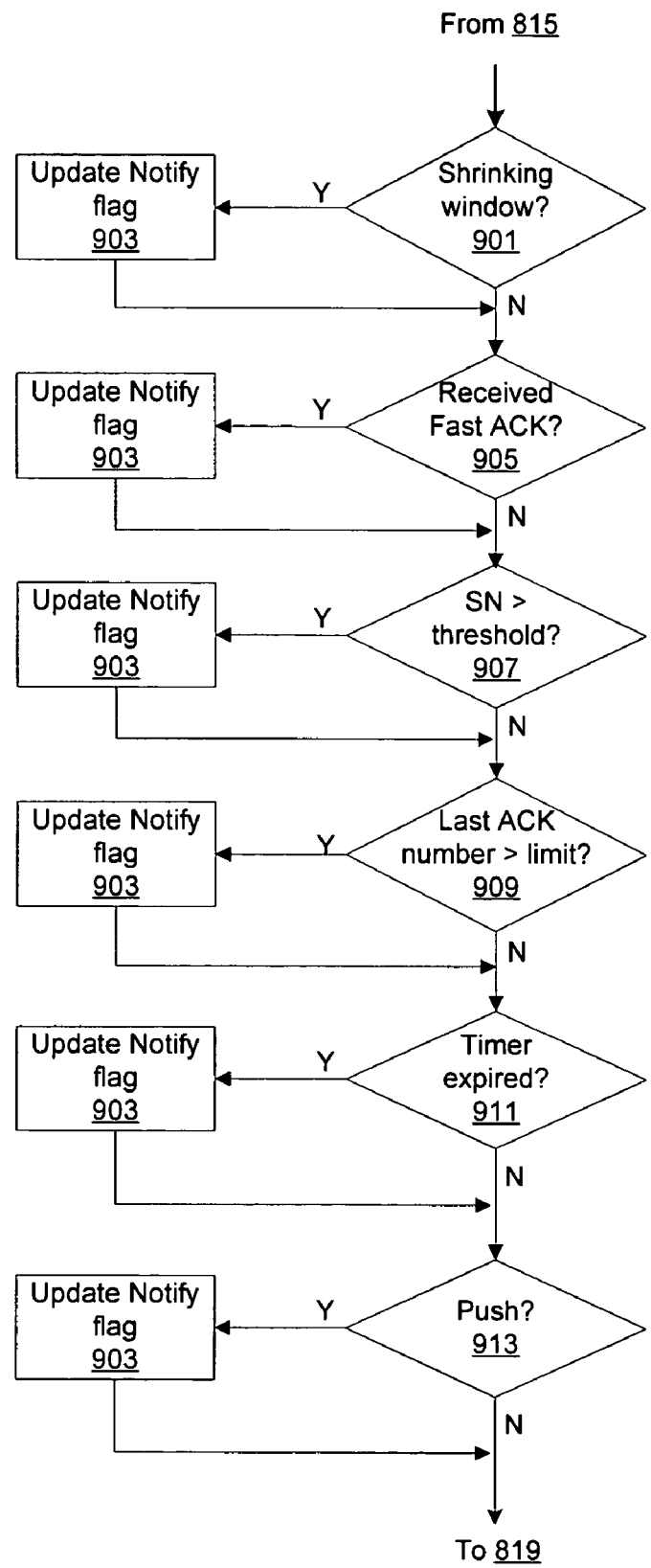
FIG. 9A illustrates an embodiment of a method of determining notifications in accordance with one or more aspects of the present invention.

FIG. 9A is a flow diagram of method steps for determining notifications, in accordance with one embodiment of the present invention. As persons skilled in the art will understand, the method steps described with respect to FIG. 9A constitute one way of performing step 817 of FIG. 8A. Rather than interrupting CPU 110 to inform TCP Stack 215 via Driver 255 that each frame has been received by a destination, thresholds may be used to control the frequency of communicating sequence numbers received by HOT Unit 250 to Driver 255 or TCP Stack 215. Likewise, rather than interrupting CPU 110 to inform Driver 255 that ACKs have been received for each transmitted frame, ACK thresholds or specific ACK numbers may be used to control the communication of ACKs received by HOT Unit 250 to Driver 255.

Reducing the frequency of interrupts CPU 110 received during frame processing frees the CPU 110 to execute other applications, typically improving performance of those applications by increasing the number of application instructions CPU 110 executes. The thresholds permit flexibility in determining a balance between interrupts to notify TCP Stack 215 of receive connection status and transmit connection status, for delegated connections.

In step 901 Parsing Unit 740 determines if the transmit window is shrinking from the right. Parsing Unit 740 determines the transmit window is shrinking from the right when an ACK number extracted from the frame summed with the receive window size extracted from the frame is less than a maximum transmit window size stored in CDT 720 for the delegated connection. Buffer Upload Unit 745 updates the maximum transmit window size stored in CDT 720 for the delegated connection with the transmit window size extracted from the frame. If, in step 901, Parsing Unit 740 determines the transmit window is shrinking from the right, then in step 903, Parsing Unit 740 sets a transmit window notification flag in Notification Unit 750.

In step 905, Parsing Unit 740 determines if duplicate ACKs (same ACK numbers in one or more received frames) have been received, indicating that the destination is requesting retransmission of one or more frames. If, in step 905, Parsing Unit 740 determines duplicate ACKs have been received, then in step 903, Parsing Unit 740 sets a "duplicate ACK notification" flag in Notification Unit 750.

In step 907, Parsing Unit 740 determines if SN is greater than a threshold, e.g., limit, the threshold indicating an incremental sequence number. The incremental sequence number is initialized by TCP Stack 215 when a delegated connection is set up and is updated by Buffer Upload Unit 745 whenever a notification is sent to Driver 255. In one embodiment, the incremental sequence number is updated by increasing the incremental sequence number by a sequence increase value. The sequence increase value may be fixed or programmed by TCP Stack 215. If, in step 907, Parsing Unit 740 determines SN is greater than the threshold, then a sequence number threshold flag is set in step 903.

In step 909, Parsing Unit 740 determines if a last ACK number (the most advanced ACK number received for the delegated connection) stored in CDT 720 is greater than a limit, the limit indicating an incremental ACK number. The last ACK number is initialized by TCP Stack 215 when a delegated connection is set up and is updated by Buffer Upload Unit 745 whenever an ACK is received. The incremental ACK number is initialized by TCP Stack 215 when a delegated connection is set up and is updated by Buffer Upload Unit 745 whenever a notification is sent to TCP Stack 215. In one embodiment, the incremental ACK number is updated by increasing the incremental ACK number by an ACK increase value. The ACK increase value may be fixed or programmed by TCP Stack 215.

In step 909, Parsing Unit 740 may also determine if the last ACK number stored in CDT 720 is greater than another limit, the other limit indicating a specific ACK number programmed by TCP Stack 215. If, in step 909, Parsing Unit 740 determines the last ACK number is greater than the limit (indicating an incremental ACK number) or the other limit (indicating a specific ACK number), then an ACK threshold flag is set in step 903.

In step 911, Parsing Unit 740 determines if one or more timers have expired. A receive ACK timer is configured to expire before TCP Stack's 215 retransmit timer expires in order to minimize unnecessary retransmissions. The expiration period of the receive ACK timer for a delegated connection stored in a register may be programmed by TCP Stack 215 and may be based on a round trip time for the delegated connection. A receive SN timer is configured to notify TCP Stack 215 that data has been received by HOT Unit 250. The expiration period of the receive SN timer for a delegated connection stored in a register may be programmed by TCP Stack 215. In an alternate embodiment, the expiration periods of the receive ACK timer and the receive SN timer are stored in an entry in CMT 725 corresponding to a delegated connection.

If, in step 911, Parsing Unit 740 determines that a timer has expired, then a corresponding notification flag is updated in step 903 and Parsing Unit 740 proceeds to step 913. For example, when the receive SN timer expires, the "sequence number threshold" flag is set and when the receive ACK timer expires, the "ACK threshold" flag is set. If, in step 911, Receive Engine 360 determines none of the one or more timers has expired, then Parsing Unit 740 outputs the parsed frame to Buffer Upload Unit 745 in step 913 and Buffer Upload Unit 745 determines if the push flag extracted from the frame has been asserted. If the push flag was asserted, then a push notification flag is set in step 903 and Buffer Upload Unit 745 proceeds to step 819 of FIG. 8A.

Figure 9B:
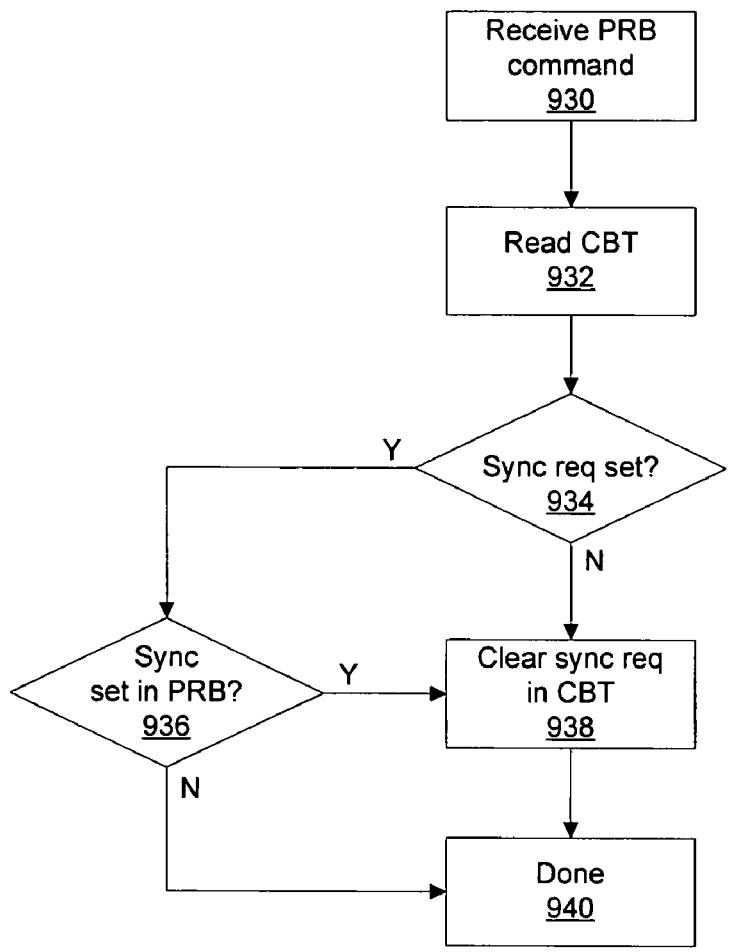
FIG. 9B illustrates an embodiment of a method of synchronizing a user buffer following legacy processing in accordance with one or more aspects of the present invention.

FIG. 9B is a flow diagram of method steps for synchronizing a user buffer following legacy processing, in accordance with one embodiment of the present invention. As previously described, a delegated connection will be processed using legacy buffers when Parsing Unit 740 detects a frame with a sequence number greater than an expected sequence number, DCT SN. For example, when one or more frames are lost due to a transmission error. Notification Unit 750 requests legacy processing for the connection and Buffer Upload Unit 745 invalidates the HOT buffers for the connection. Because SN stored in CDT 720 is not changed, all subsequent received frames will be considered to be out-of-sequence until a retransmission occurs.

Until the retransmitted frame is received, Buffer Upload Unit 745 uploads frames received for the connection to legacy buffers. TCP Stack 215 copies the payload data from legacy buffers to user buffers. When the retransmitted frame is uploaded to a legacy buffer, TCP Stack 215 sends an ACK for all frames received in sequence. Transmit Engine 320 updates the DCT SN stored in CDT 720 for the connection. When all of the retransmitted frames within a sequence have been uploaded to legacy buffers, TCP Stack 215 posts HOT buffers prior to sending the ACK. Posting the HOT buffers allows Buffer Upload Unit 745 to resume processing incoming frames for the connection using HOT buffers without requesting user buffers.

In step 930, CMD Unit 710 receives a PRB command from the command ring via DMA Engine 310. The PRB command includes a DCT index corresponding to an entry for a connection, and a sync bit, among other fields. In step 932, CMD Unit 710 reads CBT 715 using the index. In step 934, CMD Unit 710 determines if the sync request flag read from the entry in CBT 715 is set, and if so, in step 936 CMD Unit 710 determines if the sync bit in the PRB command is set. If, in step 934, CMD Unit 710 determines the "sync request" flag read from the entry in CBT 715 is not set, then CMD Unit 710 clears the entry's "sync request" flag in CBT 715 in step 938, and proceeds to step 940. When the "sync request" flag is cleared, the connection may be processed using HOT buffers. If, in step 936, CMD Unit 710 determines the sync bit in the PRB command is not set, the "sync request" flag is not cleared and the connection continues to be processed using legacy processing.

Transmit Engine 320 includes subunits for offloading outbound frame processing from TCP Stack 215. For example, Transmit Engine 320 may be configured to perform TCP segmentation, compute TCP and IPv4 checksums, and edit outbound frames to piggyback ACKs and include the most recent state data for a delegated connection (read from DCT 350). Updates to DCT 350 made by Driver 255 or Receive Engine 360 may be included in transmissions, as described further herein.

FIG. 10A illustrates a format used to represent data for transmission as the data is transferred from System Memory 130 to HOT Unit 250 by DMA Engine 310 in accordance with one or more aspects of the present invention, for example during a "large send" transmission. Field 1007 is a medium-specific MAC header such as an Ethernet header. Field 1005 is a prototype header including a MAC header, an IP header, and a TCP header including an SN, transmit ACK number, a TCP timestamp, and the like. Field 1010 is the data for transmission and is located in TCP Stack Memory Space 225. The combination of Field 1007, Field 1005, and Field 1010 resides in System Memory 130.

FIG. 10B illustrates a format used to represent data for transmission as the data is transmitted from Transmit Engine 320 to Transmit Interface 330 in accordance with one or more aspects of the present invention. DMA Engine 310 reads the format shown in FIG. 10A from System Memory Space 130 and Transmit Engine 320 produces the format shown in FIG. 10B when segmentation is enabled and portions of Field 1010 are included in segments, where each segment is a frame. Transmit Interface 330 outputs the IP datagram format shown in FIG. 10B as frame. In an alternate embodiment TCP Stack 215 generates protocol headers and stores the protocol headers in TCP Stack Memory Space 225. The protocol headers are read by HOT Unit 250 from TCP Stack Memory Space 225, and the data for transmission are read by HOT Unit 250 from Application Memory Space 227.

Field 1015 is an IP header, Field 1020 is a TCP header, and Field 1025 is segmented data. As persons skilled in the art will recognize, the format shown in FIG. 10B is a TCP-compliant format. The TCP header includes a transmit ACK number, a transmit SN, and the like. The segmented data is a portion of the data for transmission in Field 1010. Field 1030 is another TCP header, including an optionally updated transmit ACK number, an updated transmit SN, and the like. The updated transmit SN is increased by the amount of data bytes that were included in the previous segment, which is the same as the difference between the maximum frame size and the data link, network, and transport layer header sizes. Field 1035 is segmented data which is another portion of the data for transmission in Field 1010.

Figure 11A:
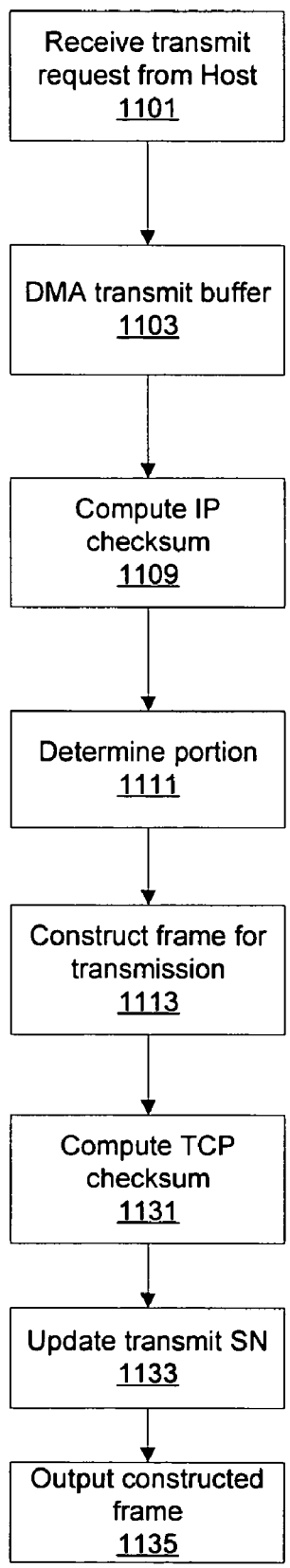
FIGS. 11A and 11B illustrate embodiments of methods of editing outbound frames in accordance with one or more aspects of the present invention.

FIG. 11A is a flow diagram of method steps for segmenting an outbound frame represented in the format shown in FIG. 10A into segments including editing the outbound frame in accordance with one embodiment of the present invention. In step 1101 DMA Engine 310 receives a transmit descriptor from TCP Stack 215 via Driver 255. The transmit descriptor includes a physical address of the location a transmit buffer stored in System Memory 130, the transmit buffer including a prototype header and data for transmission. The transmit descriptor also includes control bits specifying processing options, an optional DCT index, control bits specifying transmission options, and the like.

In step 1103, DMA Engine 310 reads the transmit buffer and outputs the transmit descriptor and transmit buffer to Transmit Engine 320. In step 1109, Transmit Engine 320 computes an IP checksum based on IP header data extracted from the prototype header. In step 1111, Transmit Engine 320 determines a portion of the data for transmission included in the transmit buffer based on the maximum segment size (set by the destination during connection setup) after segmentation. In step 1113, Transmit Engine 320 constructs a segment for transmission, as described further herein with regard to FIG. 11B.

In step 1131, Transmit Engine 320 computes a TCP checksum based on TCP header data extracted from the prototype header, connection state data read from DCT 350, and the portion of data for transmission in the current frame. The calculated checksum is stored in the frame's TCP header. In step 1133, Transmit Engine 320 updates a transmit SN stored in DCT 350 for the delegated connection by increasing the transmit SN by the difference between the size (in bytes) of the data included in the frame and the header sizes. In step 1135, Transmit Engine 320 outputs a constructed frame, including a computed TCP checksum, to Transmit Interface 330. Transmit Interface 330 outputs the constructed frame.

Figure 11B:
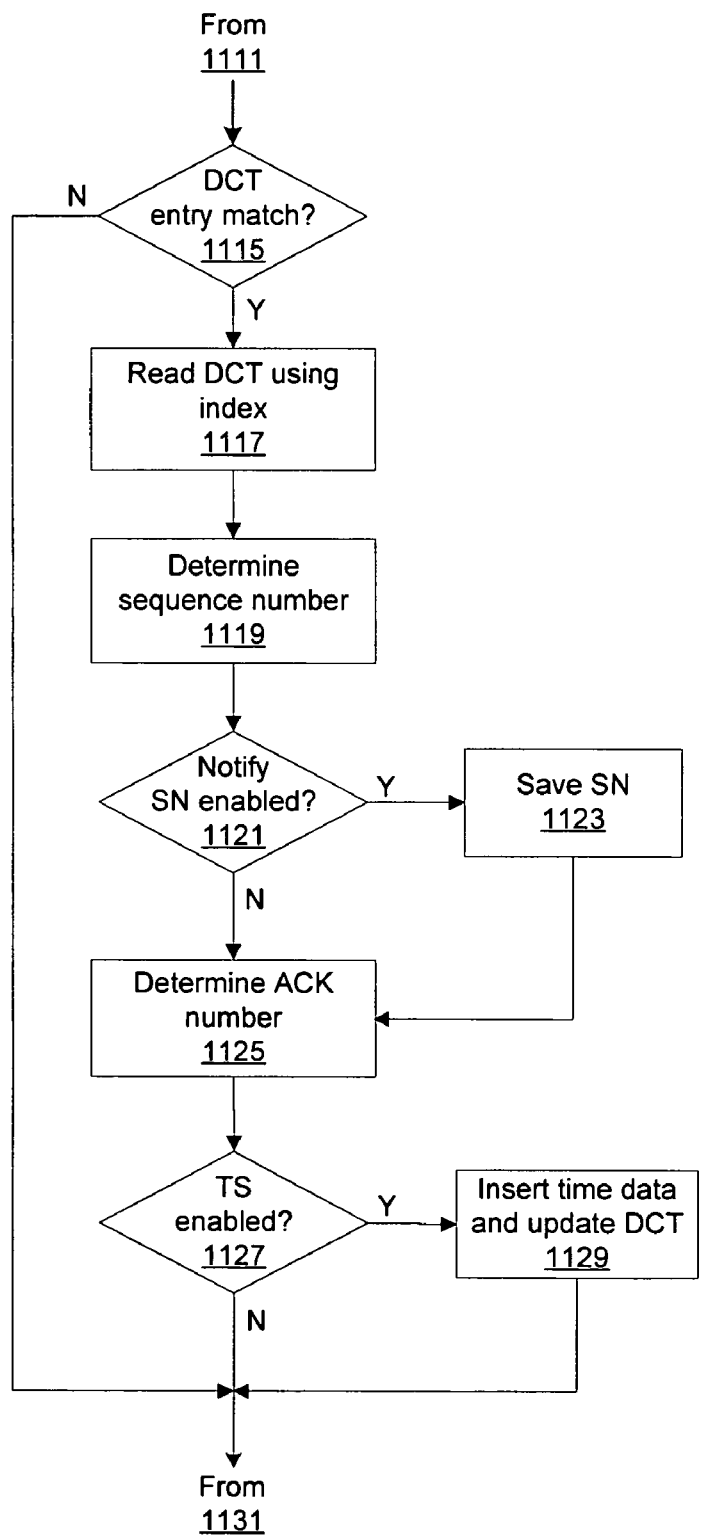

FIG. 11B is a flow diagram of method steps for constructing the outbound frame, in accordance with one embodiment of the present invention. As persons skilled in the art will understand, the method steps described with respect to FIG. 11B constitute one way of performing step 1113 of FIG. 11A. The outbound frame is constructed using connection state data stored in CDT 720; consequently the outbound frame includes the most up-to-date state data for a connection such as an ACK number corresponding to the most recently received frame. During transmission, including during segmentation, ACKs are "piggybacked" if possible, i.e., included in the frame output for transmission rather than waiting to output discrete ACKs until after a frame (large send) has been completely segmented and transmitted. Timely ACKs ensure that the receive window seen by the sender remains open, resulting in the sender continuing to transmit data. Additionally, deferring ACK transmission until a large send is complete may result in wasteful retransmissions by the sender when the sender's retransmit timer expires, or may result in unnecessary burstiness in the received data stream due to ACKs being delayed to only occur between "large sends".

In step 1115, Transmit Engine 320 uses the DCT index received in step 1101 with the transmission request to determine if the transmission request corresponds to a delegated connection, and, if it does not, proceeds to step 1131 of FIG. 11A. Otherwise, in step 1117, Transmit Engine 320 accesses CDT 720 using the DCT index received in step 1101 to obtain connection state data for the delegated connection. In step 1119, Transmit Engine 320 determines a transmit SN for the constructed frame. When the SN received from TCP Stack 215 is later in the data stream than the transmit SN stored for the connection in CDT 720, Transmit Engine 320 sets the transmit SN to the SN received from TCP Stack 215.

In step 1121, Transmit Engine 320 examines the control bits specifying processing options and determines if TCP Stack 215 requests Transmit Engine 320 to save the SN of the first byte of the frame in CDT 720. The saved SN is used in step 907 of FIG. 9A to control notification of TCP Stack 215 when an ACK corresponding to the saved SN is received. If, in step 1121, Transmit Engine 320 determines TCP Stack 215 requests notification for a specific ACK number, then in step 1123 Transmit Engine 320 saves the SN as a specific ACK number in CDT 720 for the connection.

In step 1125, Transmit Engine 320 determines an ACK number for the constructed frame. When the ACK number received from TCP Stack 215 is later in the data stream than the DCT SN stored for the connection, Transmit Engine 320 sets the DCT SN to the ACK number received from TCP Stack 215. Transmit Engine 320 also sets the last ACK number stored for the connection in CDT 720 to the larger of the DCT SN or the ACK number received from TCP Stack 215.

In step 1127, Transmit Engine 320 determines if the TCP timestamp option is enabled by examining the connection state data stored for the delegated connection in CDT 720. When the TCP timestamp option is not enabled, Transmit Engine proceeds to step 1131 of FIG. 11A. Otherwise, in step 1129, Transmit Engine 320 includes the current value of a free running timer in the TCP header of the constructed frame. Transmit Engine 320 also includes the greater of a timestamp received from TCP Stack 215 and a timestamp stored for the connection (most recently received timestamp) in CDT 720. When the timestamp received from TCP Stack 215 is greater than the timestamp stored for the connection, the timestamp stored for the connection is set to the timestamp received from TCP Stack 215. Transmit Engine 320 proceeds to step 1131 to compute the TCP checksum for the constructed frame.

Figure 11C:
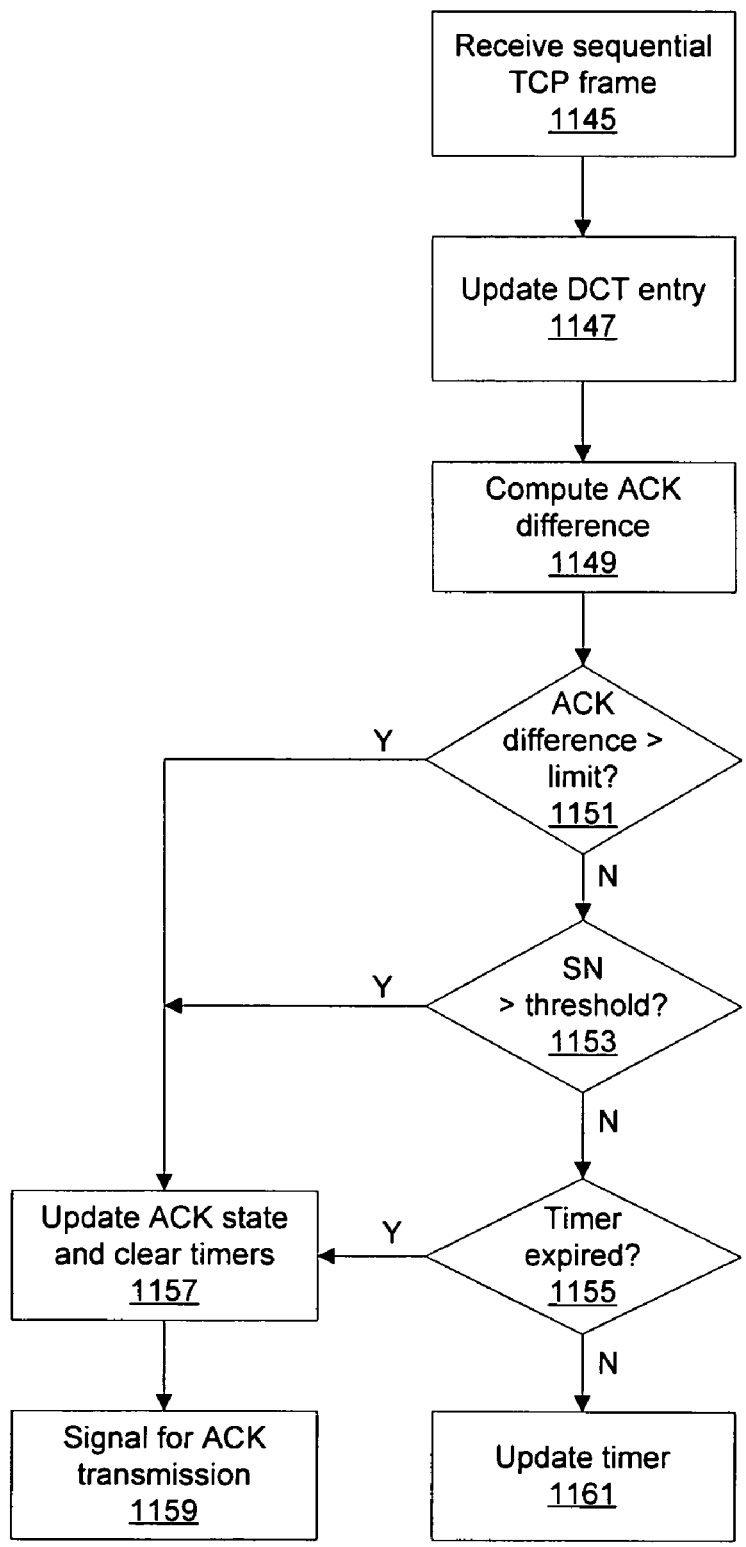
FIG. 11C illustrates an embodiment of a method of generating acknowledgements for inclusion in a transmission in accordance with one or more aspects of the present invention.

FIG. 11C is a flow diagram of method steps for generating ACKs for inclusion in a transmission, i.e., piggybacking, in accordance with one embodiment of the present invention. The method illustrated in FIG. 11C is completed by Receive Engine 360 as frames are received. In step 1145, Receive Engine 360 receives a sequential TCP frame for a delegated connection. In step 1147, Receive Engine 360 updates connection state data, e.g., TCP timestamp, SN, transmit window size, and the like, in DCT 350 corresponding to the delegated connection. DCT SN is updated to the next expected incoming SN.

In step 1149, Receive Engine 360 computes an ACK difference that is the difference between the SN and the last ACK number (read from DCT 350). In step 1151 Receive Engine 360 determines if the ACK difference is greater than a limit, the limit programmed by TCP Stack 215 to trigger an ACK to a received frame. If the ACK difference is greater than the limit, Receive Engine 360 proceeds to step 1157. Otherwise, in step 1153, Receive Engine 360 determines if the DCT SN is greater than a threshold, the threshold being an incremental sequence number or a specific sequence number. If the DCT SN is greater than the threshold, Receive Engine 360 proceeds to step 1157. Otherwise, in step 1155, Receive Engine 360 determines if the previously described transmit ACK timer has expired, and, if not, the transmit ACK timer and the unACKnowledged count is updated. If, in step 1155, Receive Engine 360 determines the transmit ACK timer has expired, then in step 1157 Receive Engine 360 updates connection state data stored in DCT 350 for the delegated connection, e.g., clearing the unACKnowledged count, updating the last ACKnowledged number, updating the incremental sequence number, and the like. Receive Engine 360 also resets the transmit ACK timer. In step 1159, Receive Engine 360 signals Transmit Engine 320 to include an ACK in a frame for transmission, i.e., by piggyback an ACK.

HOT Unit 350 offloads TCP processing for received valid TCP frames for delegated connections while permitting flexibility for Driver 255 or TCP Stack 215 to determine thresholds for interrupts based on received ACKs and timers. The thresholds may be used to reduce interrupts, freeing CPU 110 to process other applications. Furthermore, HOT Unit 350 generates ACKs for transmission and edits outbound frames to piggyback ACKs, to compute TCP and IPv4 checksums, and to perform TCP segmentation. Timely generation and transmission of ACKs to a sender may keep the receive window open, improving bandwidth utilization and reducing unnecessary retransmissions during unidirectional and bidirectional communication. Finally, payload data uploads to user buffers in Application Memory Space 227 reduces the need to copy data from Driver Memory Space 235 to Application Memory Space 227. When user buffers are not available for a delegated connection and Receive FIFO 730 is full, legacy buffers may be used to upload received frames rather than not accepting incoming data. HOT Unit 250 does not rely on large amounts of dedicated memory or a dedicated processor while providing offloading for some TCP processing from CPU 110. Hot Unit 250 also offloads some TCP processing from a host processor and handles excess connections while accepting incoming data.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

What is claimed is:

1. A method of processing frames for a delegated TCP connection, comprising:
    receiving a user buffer descriptor specifying a location of a plurality of user buffers in a first portion of memory that is allocated to an application program, wherein each user buffer is configured to store processed frame data for the delegated TCP connection;
    processing a first portion of the frames using an offload unit to produce first processed frame data;
    indicating in a field of the user buffer descriptor how many of the user buffers are accepted for the delegated TCP connection before the processed frame data is stored in one of the user buffers;
    uploading the first processed frame data to a user buffer in the first portion of memory that is allocated to the application program;
    processing a second portion of the frames using the offload unit to produce second processed frame data;
    uploading the second processed frame data to a legacy buffer in a second portion of the memory that is allocated to a software driver configured to communicate between the offload unit and a TCP stack; and
    processing the second processed frame data using the TCP stack executed on a CPU to produce third processed frame data.

2. The method of claim 1, further comprising determining whether a special case exists during the processing of each of the frames.

3. The method of claim 1, wherein at least a portion of the second processed frame data is partially processed frame header data.

4. The method of claim 1, wherein at least a portion of the second processed frame data is payload data.

5. The method of claim 1, further comprising finishing processing of the second processed frame data by the TCP stack executed on the CPU.

6. The method of claim 1, further comprising determining that a sync request flag is not asserted, the sync request flag controlling flushing of existing user buffer descriptors for user buffers that do not store processed frame data and discarding of new user buffer descriptors for the delegated TCP connection that are received while the sync request flag is asserted.

7. The method of claim 1, further comprising:
    determining that a threshold value specified for frames transmitted from the offload unit on the delegated TCP connection is exceeded; and
    setting a flag in a notification field indicating that the threshold value is exceeded.

8. The method of claim 1, further comprising the step of issuing a notification command after the first processed frame data is uploaded to the user buffer.

9. A system for processing data for a delegated TCP connection, comprising:
    a TCP stack configured to process received frames stored in at least one legacy buffer;
    a software driver configured to interface between the TCP stack and an off load unit;
    a memory configured to store user buffers in a first portion that is allocated to an application program and to store legacy buffers in a second portion that is allocated to the software driver, wherein each user buffer is configured to store processed frame data for the delegated TCP connection; and
    the off load unit configured to:
        receive user buffer descriptors specifying locations of the user buffers;
        indicate in a field of the user buffer descriptor how many of the user buffers are accepted to store payload data for the delegated TCP connection before the processed frame data is stored in one of the user buffers;
        process frames received on the delegated TCP connection to produce payload data and partially processed frames;
        upload partially processed frames to at least one of the legacy buffers; and
        upload the payload data to at least one of the user buffers.

10. The system of claim 9, wherein the off load unit is configured to notify the TCP stack when a threshold value specified for frames transmitted from the offload unit on the delegated connection is exceeded.

11. The system of claim 9, wherein the TCP stack is configured to process frames for which a special case exists.

12. The system of claim 9, wherein the off load unit is configured to receive additional frames while uploading payload data to one of the legacy buffers or uploading processed frames to one of the user buffers.

13. The system of claim 9, further comprising storing the user buffer descriptors in a connection buffer table entry corresponding to the delegated TCP connection, wherein the connection buffer table entry includes a sync flag that controls flushing of existing user buffer descriptors for user buffers that do not store processed frame data and discarding of new user buffer descriptors for the delegated TCP connection that are received while the sync request flag is asserted.

14. The system of claim 9, wherein the offload unit is further configured to issue a notification command after the payload data is uploaded to at least one of the user buffers.

15. A method of processing frames for delegated and non-delegated TCP connections, comprising:
    receiving user buffer descriptors that specify locations of a plurality of user buffers in a first portion of memory that is allocated to an application program, wherein each user buffer is configured to store processed frame data for the delegated TCP connections;
    processing delegated TCP connections using an offload unit, the off load unit configured to process frames for which special cases do not exist to produce processed frame data;

indicating in a field of a user buffer descriptor how many of the user buffers are accepted to store processed frame data for each one of the delegated TCP connections before the processed frame data is stored in one of the user buffers;

uploading the processed frame data to a user buffer in a first portion of memory that is allocated to an application program;

processing non-delegated TCP connections using a TCP stack executing on a CPU;

uploading frame data for the non-delegated TCP connections to a legacy buffer in a second portion of the memory that is allocated to a software driver configured to communicate between the offload unit and the TCP stack; and processing all frames for which special cases exist using the TCP stack executing on the CPU.

16. The method of claim 15, further comprising updating connection state information stored in the off load unit when data is received for a delegated TCP connection.

17. The method of claim 15, further comprising updating connection state information stored in the offload unit when data is transmitted for a delegated TCP connection.

18. The method of claim 15, further comprising determining that a sync request flag is not asserted for a delegated TCP connection, the sync request flag controlling flushing of existing user buffer descriptors for user buffers that do not store processed frame data and discarding of new user buffer descriptors for the delegated TCP connection that are received while the sync request flag is asserted.

19. The method of claim 15, further comprising:
determining that a threshold value specified for frames transmitted from the offload unit on a delegated TCP connection is exceeded; and
setting a flag in a notification field indicating that the threshold value is exceeded for the delegated TCP connection.

20. The method of claim 15, further comprising the step of issuing a notification command after the processed frame data is uploaded to the user buffer.

* * * * *